US012673452B2

(12) United States Patent
Takahashi et al.

(10) Patent No.: US 12,673,452 B2
(45) Date of Patent: Jul. 7, 2026

(54) LAMINATED FILM AND MOLDED ARTICLE, AND PRODUCTION METHODS THEREFOR

(71) Applicant: NIPPON PAINT AUTOMOTIVE COATINGS CO., LTD., Osaka (JP)

(72) Inventors: Jumpei Takahashi, Hirakata (JP); Takuma Okada, Hirakata (JP); Kei Takigawa, Hirakata (JP); Kazuhito Kobayashi, Hirakata (JP); Takeki Hosokawa, Hirakata (JP); Takamitsu Watanabe, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 393 days.

(21) Appl. No.: 18/039,521

(22) PCT Filed: Dec. 3, 2021

(86) PCT No.: PCT/JP2021/044529
§ 371 (c)(1),
(2) Date: May 31, 2023

(87) PCT Pub. No.: WO2022/118967
PCT Pub. Date: Jun. 9, 2022

(65) Prior Publication Data
US 2024/0091998 A1 Mar. 21, 2024

(30) Foreign Application Priority Data
Dec. 4, 2020 (JP) ................................. 2020-202122

(51) Int. Cl.
B29C 45/14 (2006.01)
G02B 1/111 (2015.01)
G02B 1/14 (2015.01)

(52) U.S. Cl.
CPC .. B29C 45/14811 (2013.01); B29C 45/14688 (2013.01); G02B 1/111 (2013.01);
(Continued)

(58) Field of Classification Search
CPC ...................... G02B 1/14; G02B 1/111; C09D 133/00–133/26
See application file for complete search history.

(56) References Cited

U.S. PATENT DOCUMENTS 6,899,957 B2 * 5/2005 Nishida .................... G02B 1/14
428/323
12,044,823 B2 * 7/2024 Okada ................... B32B 27/365
(Continued)

FOREIGN PATENT DOCUMENTS

JP 2007-328284 12/2007
JP 2015-4937 1/2015
(Continued)

OTHER PUBLICATIONS

Extended European search report issued Oct. 2, 2024 in corresponding European Patent Application No. 21900716.8.
(Continued)

*Primary Examiner* — Prashant J Khatri
(74) *Attorney, Agent, or Firm* — Wenderoth, Lind & Ponack, L.L.P.

(57) ABSTRACT

Provided is an after-cure type laminated film having a low reflectance. A laminated film comprising: a transparent support substrate, an uncured hard coat layer formed on at least one surface of the transparent support substrate, and
an uncured optical interference layer formed on the uncured hard coat layer, wherein the uncured hard coat layer comprises an active energy ray-curable composition for forming a hard coat layer, the uncured optical interference layer comprises an active energy ray-
(Continued)

10 curable composition for forming an optical interference layer, the transparent support substrate has a thickness of 50 μm or more and 600 μm or less, a stretch ratio of the laminated film at 160° C. is 50% or more, and the laminated film heat-treated at a temperature of 90° C. for 30 minutes has a minimum value $R_{AH}$ of a reflectance taken between wavelengths of 380 nm and 780 nm of 2% or less and measured from a side of the uncured optical interference layer.

17 Claims, 6 Drawing Sheets

(52) U.S. Cl.
CPC ...... *G02B 1/14* (2015.01); *B29C 2045/14713* (2013.01); *B29K 2995/007* (2013.01); *B29K 2995/0097* (2013.01)

(56) References Cited

U.S. PATENT DOCUMENTS

| | | | |
|---|---|---|---|
| 2002/0127408 A1 | 9/2002 | Nishida et al. | |
| 2005/0163977 A1 | 7/2005 | Miyatake et al. | |
| 2012/0184640 A1* | 7/2012 | Kim | G02B 1/105 |
| | | | 523/400 |
| 2013/0122311 A1* | 5/2013 | Yoshihara | C09D 175/16 |
| | | | 428/510 |
| 2016/0349422 A1 | 12/2016 | Yamada et al. | |
| 2021/0190994 A1 | 6/2021 | Nakagawa et al. | |
| 2022/0032587 A1 | 2/2022 | Watanabe et al. | |
| 2022/0152979 A1 | 5/2022 | Kakeya et al. | |
| 2022/0299681 A1 | 9/2022 | Okada et al. | |

FOREIGN PATENT DOCUMENTS

| | | |
|---|---|---|
| JP | 2021-101221 | 7/2021 |
| JP | 6941747 | 9/2021 |
| WO | 2015/141105 | 9/2015 |
| WO | 2020/116576 | 6/2020 |
| WO | 2020/189707 | 9/2020 |
| WO | 2021/020301 | 2/2021 |

OTHER PUBLICATIONS

International Preliminary Report on Patentability issued May 30, 2023 in International (PCT) Application No. PCT/JP2021/044529.
International Search Report (ISR) issued Feb. 15, 2022 in International (PCT) Application No. PCT/JP2021/044529.

* cited by examiner

<u>10</u>

LAMINATED FILM AND MOLDED ARTICLE, AND PRODUCTION METHODS THEREFOR

TECHNICAL FIELD

The present invention relates to a laminated film, a formed article, and methods for manufacturing them.

BACKGROUND ART

Displays are used in a wide variety of fields such as computers, televisions, cellular phones, portable information terminal devices (tablet personal computers, mobile devices, electronic notebooks, etc.), and automobile display panels such as digital meters, instrument panels, navigation devices, console panels, center clusters and heater control panels. Such products are often covered with a protective material. The protective material is usually obtained by forming a film having a hard coat layer.

The protective material of a display may be further provided with a low refractive index layer for the purpose of reducing the reflectance of the viewing-side surface. Patent Literature 1 teaches a laminated film in which a hard coat layer and a low refractive index layer (an optical interference layer) are sequentially laminated on a transparent support.

CITATIONS LIST

Patent Literature

Patent Literature 1: JP-A-2015-004937

SUMMARY OF INVENTION

Technical Problems

In recent years, it has been proposed to provide various decorative layers on a protective material for a display or to form the protective material for a display into a three-dimensional shape according to purposes such as use and design. However, when a treatment involving heating is performed, the reflectance of a laminated film may increase.

The present invention solves the above-described existing problems, and an object of the present invention is to provide an after-cure type laminated film and a formed article both having a low reflectance and methods for manufacturing the same.

Solutions to Problems

In order to solve the above-described problems, the present invention provides the following embodiments.

[1]
A laminated film comprising:
a transparent support substrate,
an uncured hard coat layer formed on at least one surface of the transparent support substrate, and
an uncured optical interference layer formed on the uncured hard coat layer, wherein
the uncured hard coat layer comprises an active energy ray-curable composition for forming a hard coat layer,
the uncured optical interference layer comprises an active energy ray-curable composition for forming an optical interference layer,
the transparent support substrate has a thickness of 50 µm or more and 600 µm or less, a stretch ratio of the laminated film at 160° C. is 50% or more, and
the laminated film heat-treated at a temperature of 90° C. for 30 minutes has a minimum value $R_{AH}$ of a reflectance taken between wavelengths of 380 nm and 780 nm of 2% or less and measured from a side of the uncured optical interference layer.

[2]
The laminated film according to [1], wherein
the minimum value $R_{AH}$ of the reflectance and a minimum value $R_{BH}$ of the reflectance of the laminated film before being heat-treated taken between the wavelengths of 380 nm and 780 nm and measured from the side of the uncured optical interference layer satisfy a relationship:

$$100 \times |R_{AH} - R_{BH}|/R_{BH} \leq 20(\%).$$

[3]
The laminated film according to [1] or [2], wherein
the composition for forming an optical interference layer comprises a first layer-forming component and low-refractive particles, and
the first layer-forming component comprises a first reactive component having two or more polymerizable functional groups in one molecule,
the first reactive component comprises at least one selected from the group consisting of a first polymer having a weight-average molecular weight of more than 10,000, a first oligomer having a weight-average molecular weight of 10,000 or less, and a first monomer having a weight-average molecular weight of 10,000 or less, and
a content X of the low-refractive particles, a total content Y of the first oligomer and the first monomer, and a content Z of the first polymer satisfy the relationship:

$$X + Y + Z = 100,$$
$$X \geq 30,$$
$$Y \geq 0,$$
$$Z \geq 0, \text{ and}$$
$$Z \leq 1/2X - 15.$$

[4]
The laminated film according to any one of [1] to [3], wherein the composition for forming a hard coat layer comprises a second layer-forming component,
the second layer-forming component comprises a second reactive component having two or more polymerizable functional groups in one molecule, and
the second reactive component comprises at least one of a second oligomer having a weight-average molecular weight of 10,000 or less and a second monomer having a weight-average molecular weight of 10,000 or less.

[5]
The laminated film according to [4], wherein the second reactive component further comprises a second polymer having a weight-average molecular weight of more than 10,000.

[6]

The laminated film according to [4] or [5], wherein a total content of the second oligomer and the second monomer is 25 parts by mass or more and 65 parts by mass or less based on 100 parts by mass of a solid content of the composition for forming a hard coat layer.

[7]

The laminated film according to any one of [1] to [6], further comprising at least one uncured functional layer between the uncured hard coat layer and the uncured optical interference layer.

[8]

The laminated film according to any one of [1] to [7], wherein a hardness $H_{BC}$ measured from an uncured optical interference layer side by a nanoindentation method is 0.1 GPa or more and 0.5 GPa or less.

[9]

The laminated film according to any one of [1] to [8], wherein the laminated film irradiated with an active energy ray having an integral light quantity of 2000 mJ/cm$^2$ has a hardness $H_{AC}$ of 0.25 GPa or more and 0.7 GPa or less as measured from the side of the optical interference layer by a nanoindentation method.

[10]

The laminated film according to any one of [1] to [9], wherein the uncured hard coat layer has a thickness of 2 μm or more and 30 μm or less.

[11]

The laminated film according to any one of [1] to [10], wherein the uncured optical interference layer has a thickness of 15 nm or more and 200 nm or less.

[12]

A formed article comprising the laminated film according to any one of [1] to [11] cured.

[13]

The formed article according to [12], wherein
the hard coat layer is disposed on one main surface of the transparent support substrate, and
the formed article further comprises a decorative layer disposed on the other main surface of the transparent support substrate.

[14]

The formed article according to [13], further comprising a formed resin layer that covers at least part of the decorative layer.

[15]

A method for manufacturing a laminated film, the method comprising:
a step of forming an uncured hard coat layer by applying an active energy ray-curable composition for forming a hard coat layer to one surface of a transparent support substrate having a thickness of 50 Inn or more and 600 μm or less;
a step of forming an uncured optical interference layer by applying an active energy ray-curable composition for forming an optical interference layer to one surface of another support substrate; and
a lamination step of bonding a surface of the uncured hard coat layer on a side opposite from the transparent support substrate and a surface of the uncured optical interference layer on a side opposite from the other support substrate to obtain a laminated film, wherein
a stretch ratio of the laminated film at 160° C. is 50% or more, and
the laminated film heat-treated at a temperature of 90° C. for 30 minutes has a minimum value $R_{AH}$ of a reflectance taken between wavelengths of 380 nm and 780 nm of 2% or less and measured from a side of the uncured optical interference layer.

[16]

A method for manufacturing a formed article, the method comprising:
a decoration step of forming a decorative layer on another main surface of the transparent support substrate of the laminated film according to any one of [1] to [11]; and
a curing step of irradiating the laminated film with an active energy ray after the decoration step, wherein
the decoration step includes a heating step of heating the laminated film at 80° C. or more for 20 minutes or more.

[17]

The method for manufacturing a formed article according to [16], further comprising an injection molding step of, after the decoration step, making the optical interference layer face a mold and injecting a resin for forming toward the decorative layer.

[18]

The method for manufacturing a formed article according to [17], wherein
the mold imparts a three-dimensional shape to the laminated film, and
the method further comprises a preforming step of forming the laminated film into a shape conforming with the three-dimensional shape after the decoration step and before the injection molding step.

Advantageous Effects of Invention

According to the present invention, it is possible to provide an after-cure type laminated film and a formed article both having low reflectance, and methods for manufacturing the same.

DESCRIPTION OF EMBODIMENTS

Figure 1:
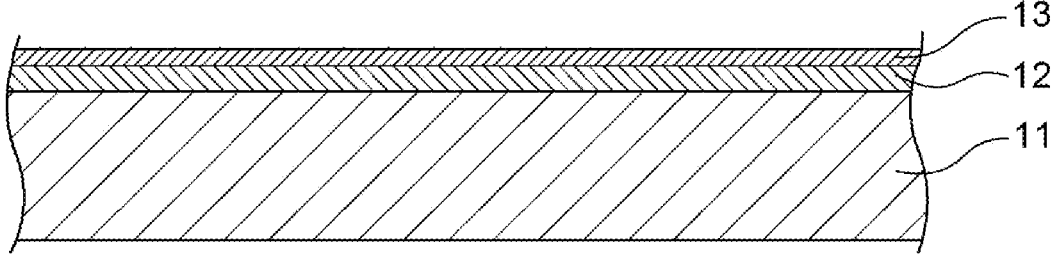
FIG. 1 is a cross-sectional view schematically showing a laminated film according to one embodiment of the present invention.

As a protective film for a display, a laminated film called a precure type is used. As described in Patent Literature 1, in a precure type laminated film, each layer is already cured at the time of preforming. Thus, in injection molding into a three-dimensional shape or in preforming performed before the injection molding, the laminated film cannot follow a mold having a deep three-dimensional shape, so that the laminated film may be cracked or whitened.

In order to make the precure type laminated film follow a mold having a deep three-dimensional shape, it is conceivable to lower the hardness after curing through lowering the crosslinking density of the laminated film. However, when the crosslinking density is low, it is difficult to obtain sufficient mechanical properties or chemical resistance.

Curing the laminated film after preforming can increase the crosslinking density of the laminated film as a final product and at the same can make the laminated film follow a mold having a deep three-dimensional shape. Such a laminated film is called after-cure type. An after-cure type laminated film comprises an uncured hard coat layer and an uncured optical interference layer.

When the after-cure type laminated film is used, mix of phases may occur at an interface between the uncured hard coat layer and the uncured optical interference layer due to heat-treatment applied when a decorative layer is formed on the laminated film. When mix of phases occurs at this interface, the reflectance increases.

In view of this, in the present embodiment is proposed a laminated film having a low reflectance even after heat treatment. Specifically, a laminated film heat-treated at a temperature of 90° C. for 30 minutes has a minimum value $R_{AH}$ of a reflectance taken between wavelengths of 380 nm and 780 nm of 2% or less and measured from a side of an uncured optical interference layer. Thus, the laminated film according to the present embodiment can be decorated or molded into a complicated shape while maintaining a low reflectance.

The laminated film is of an after-cure type and has a stretch ratio of 50% or more at 160° C. Thus, the occurrence of cracks and whitening in the preforming and the injection molding step are prevented, so that the appearance of the formed product is improved. Since cracks are less likely to occur, the functions of the hard coat layer and the optical interference layer are more effectively exhibited. In addition, since the stretch ratio or the laminated film at 160° C. is 50% or more and the thickness of the transparent support substrate is 50 μm or more and 600 μm or less, even when formed into a complicated shape, the resulting formed article has sufficient rigidity.

The preforming makes the laminated film stretch. When an after-cure type laminated film is used, the laminated film to be preformed is in an uncured state. In other words, the stretch treatment is applied to an uncured laminated film, and no excessive stretch treatment is performed after curing. For this, each layer can be formed of a layer-forming composition that will have a high crosslinking density. That is, the hardness of each layer after curing can be further increased.

In addition, since both the hard coat layer and the optical interference layer are uncured at the time of lamination, a high degree of adhesion between the layers will be attained. Furthermore, the unevenness of the surface of each layer can be leveled by heat treatment. Accordingly, a laminated film having high smoothness can be obtained.

A. Laminated Film

The laminated film according to the present embodiment has a transparent support substrate, an uncured hard coat layer formed on at least one surface of the transparent support substrate, and an uncured optical interference layer formed on the uncured hard coat layer. The uncured hard coat layer comprises an active energy ray-curable composition for forming a hard coat layer. The uncured optical interference layer comprises an active energy ray-curable composition for forming an optical interference layer.

The term "uncured" refers to a state in which the resin is not completely cured. The hard coat layer and the optical interference layer contained in the laminated film may be in a semi-cured state. The laminated film is of an after-cure type.

The term "cure" is synonymous with "dry through" defined in JIS K 5500 (glossary of terms for coating materials). That is, curing means a) when the center of a test piece is strongly sandwiched between the thumb and the forefinger, no dent due to the fingerprint is formed on the coating surface and no movement of the coating film is noticed, and when the coating surface is rapidly rubbed repeatedly with the fingertip, a dry hard state in which no scratch marks are formed is obtained.

The laminated film irradiated with an active energy ray having an integral light quantity of 200 mJ/cm 2 can be said to be completely cured.

The term "semi-cure" is synonymous with "dry to touch" defined in JIS K 5500 (glossary of terms for coating materials). That is, the semi-curing refers to when the center of a painted surface is lightly rubbed with a fingertip and the painted surface is in a "dry to touch" state with no rubbing marks. The laminated film irradiated with an active energy ray having an integral light quantity of 1 mJ/cm 2 or more and less than 200 mJ/cm 2 can be said to be semi-cured.

A state in which the hard coat layer and the optical interference layer are not exposed to active energy rays or are exposed to active energy rays of less than 1 mJ/cm 2 can be said as being uncured.

(Reflectance)

A laminated film subjected to heating treatment at a temperature of 90° C. for 30 minutes (hereinafter, the heat treatment is sometimes referred to as specific heating treatment) has a minimum value $R_{AH}$ of a reflectance taken between wavelengths of 380 nm and 780 nm of 2.0% or less and measured from a side of an uncured optical interference layer. The fact that the minimum value $R_{AH}$ of the reflectance is within this range indicates that the occurrence of the mix of phases between the uncured hard coat layer and the uncured optical interference layer is prevented and a clear interface is formed between both the layers. The minimum value $R_{AH}$ of the reflectance is preferably 1.8% or less, and more preferably 1.6% or less. The minimum value of the reflectance of the laminated film according to the present embodiment may be 2.0% or less even after heating treatment at a temperature of 90° C. or more and 120° C. or less for 30 minutes or more and 90 minutes or less.

The laminated film according to the present embodiment has superior antireflection performance. A formed article formed by curing the laminated film also has superior antireflection performance. The reflection of external light on the formed article is reduced by an antireflection effect. The formed article has good display characteristics and good visibility.

The minimum value $R_{AH}$ of the reflectance is determined by measuring all reflected light including specular reflection in a wavelength region of 380 nm or more and 780 nm or less. The minimum value $R_{AH}$ of the reflectance is the smallest value among the reflectances at respective wavelengths measured by a so-called SCI (Specular Component Include) method. Since this method is hardly affected by the surface condition of the object to be measured, the reflectance of the uncured layer can be measured.

Specifically, the minimum value $R_{AH}$ of the reflectance of the laminated film can be measured by the following method.

A black coating material (for example, product name: CZ-805 BLACK (manufactured by NIKKO BICS Co., Ltd.) is applied to a surface of the transparent support substrate opposite from the uncured hard coat layer with a bar coater such that a dry film thickness is 3 µm or more and 6 µm or less. Thereafter, heating treatment is performed at a temperature of 90° C. for 30 minutes to prepare an evaluation sample M.

From the optical interference layer side of the obtained evaluation sample M, the reflectance by the SCI method in a wavelength region of 380 nm or more and 780 nm or less is measured at wavelength intervals of 10 nm using a spectrophotometer (e.g., SD7000 manufactured by Nippon Denshoku Industries Co., Ltd.). The reflectance is measured at arbitrary five or more points (preferably, 10 points) of the evaluation sample M. A minimum value of the reflectance is determined for each measurement point. The minimum value $R_{AH}$ of the reflectance of the laminated film according to the present embodiment does not exceed 2% at all measurement points.

The minimum value $R_{AH}$ of the reflectance may be measured using an evaluation sample N prepared by irradiating the evaluation sample M with an active energy ray having an integral light quantity of 200 mJ/cm 2 or more. This is because the reflectance hardly changes before and after curing.

It is desirable that the reflectance does not change much before and after the heating treatment. Accordingly, it is easy to obtain stable antireflection performance without being affected by variations in manufacture conditions of the process. For example, the minimum value $R_{AH}$ of the reflectance and a minimum value $R_{BH}$ of the reflectance of the laminated film before the specific heating treatment measured from the side of the uncured optical interference layer preferably satisfy a relationship: $100 \times |R_{AH} - R_{BH}|/R_{BH} \leq 20$ (%). $100 \times |R_{AH} - R_{BH}|/R_{BH}$ is more preferably 10% or less, and particularly preferably 5% or less.

The reflectance of the laminated film of the present embodiment is maintained low even when the laminated film is subjected to the specific heating treatment. In addition, the curing of the composition for forming a hard coat layer and the composition for forming an optical interference layer hardly proceeds through the specific heating treatment. Thus, the laminated film may be subjected to the specific heating treatment and another heating treatment before being completely cured without affecting the adhesion or the stretch ratio in addition to the reflectance. By the heating treatment, the smoothness of each layer can be improved. Accordingly, the smoothness of the resulting formed article is also improved.

The conditions for the other heating treatment may be appropriately set according to the composition of each layer. The temperature of the other heating treatment may be 90° C. or more and 220° C. or less, 100° C. or more and 220° C. or less, or 110° C. or more and 220° C. or less. The time of the other heat treatment may be 10 seconds or more and 10 minutes or less.

In the preforming step, the laminated film is formed into a desired three-dimensional shape by thermoforming. The other heating treatment also may be performed by utilizing the heat applied in the preforming step. By performing the thermoforming at about 150° C. or more and 190° C. or less for 10 seconds or more and 5 minutes or less, it is possible to sufficiently level each uncured layer while performing the preforming.

(Stretch Ratio)

The stretch ratio $E_{160}$ of the laminated film at 160° C. is 50% or more. In this case, the laminated film is sufficiently stretched at a forming temperature of 150° C. or more and 190° C. or less. Thus, the laminated film can be formed into a complicated three-dimensional shape without generating cracks. In particular, damage to the laminated film is easily controlled in the preforming step. Thus, a formed article having functions of a hard coat layer and an optical interference layer and having a complicated three-dimensional shape can be obtained. The laminated film is molded into a three-dimensional shape by, for example, preforming and insert molding or the like according to the required physical properties, shape, etc.

The functions of the hard coat layer and the optical interference layer are, for example, superior hard coat performance and antireflection performance. The hard coat performance may be, for example, high hardness, abrasion resistance, and chemical resistance.

The stretch ratio $E_{160}$ of the laminated film is preferably 60% or more, and more preferably 70% or more. The stretch ratio $E_{160}$ of the laminated film may be less than 400%, less than 350%, or less than 300%. The stretch ratio at 160° C. of the formed article obtained by curing the laminated film is less than 15%, and may be 5% or less.

The stretch ratio $E_{160}$ can be measured, for example, as follows.

A tensile tester having a distance between chucks of 150 mm and an evaluation sample cut into a length of 200 mm×a width of 10 mm are prepared. Under a 160° C. atmosphere and under the conditions of a tensile force of 5.0 Kgf and a tensile speed of 300 mm/min, the evaluation sample is stretched by 10% in the long side direction. The presence or absence of cracks in the stretched evaluation sample is visually checked.

When there are no cracks generated, a new sample is cut out, and then stretched up to 20% in the long side direction. Then, similarly, the presence or absence of cracks is visually checked. This procedure is repeated while increasing the stretch ratio by 10%, and the stretch ratio attained when a crack is first observed is taken as the stretch ratio $E_{160}$ of the laminated film.

(Thickness)

The thickness of the transparent support substrate is 50 µm or more and 600 µm or less. Accordingly, even when the laminated film is stretched, the laminated film can maintain rigidity. In addition, warpage of the laminated film and the formed article is easily inhibited. Furthermore, since the transparent support substrate and the laminated film can be wound into a roll form, roll-to-roll processing can be performed.

The thickness of the transparent support substrate is preferably 100 µm or more, and more preferably 200 µm or more. The thickness of the transparent support substrate is preferably 500 µm or less, more preferably 480 µm or less, even more preferably 450 µm or less, and particularly preferably 400 µm or less.

The thickness of the uncured hard coat layer is not particularly limited. For example, the thickness of the uncured hard coat layer is 2 µm or more and 30 µm or less. The uncured hard coat layer is a dried and uncured hard coat layer (hereinafter, simply referred to as uncured hard coat layer). When the uncured hard coat layer has such a thickness, warpage after curing is easily inhibited. In addition, a hard coat layer having superior hard coat performance is obtained.

The thickness of the uncured hard coat layer is more preferably 3 μm or more. The thickness of the uncured hard coat layer is more preferably 25 μm or less, and particularly preferably 20 μm or less.

The thickness of the uncured optical interference layer is not particularly limited. The thickness of the uncured optical interference layer is, for example, 15 nm or more and 200 nm or less. The thickness of the uncured optical interference layer is preferably 60 nm or more, and more preferably 65 nm or more. The thickness of the uncured optical interference layer is preferably 180 nm or less. When the thickness of the uncured optical interference layer is in this range, good antireflection property can be imparted to the formed article.

(Hardness)

The hardness $H_{BC}$ measured by a nanoindentation method from the optical interference layer side of the laminated film is preferably 0.1 GPa or more from the viewpoint of easily inhibiting damage in the subsequent steps. When the hardness $H_{BC}$ is 0.1 GPa or more, such defects as depressions or damages to be formed at the time of slit formation and cutting, depressions to be formed due to foreign matters mixed when a plurality of laminated films are laminated, squeegee marks, and suction marks are inhibited, so that the yield is likely to improve.

That the hardness $H_{BC}$ is 0.5 GPa or less is preferable in that adhesion between the uncured hard coat layer and the uncured optical interference layer is easily improved. When the hardness $H_{BC}$ is 0.5 GPa or less, in laminating the uncured optical interference layer on the uncured hard coat layer, both the layers easily adhere to each other. Furthermore, when the uncured hard coat layer and the uncured optical interference layer are laminated by bonding, entry of air between the layers (air entrapment) is inhibited. Specifically, the hardness $H_{BC}$ is preferably 0.1 GPa or more and 0.5 GPa or less. The hardness $H_{BC}$ is more preferably 0.15 GPa or more. The hardness $H_{BC}$ is more preferably 0.4 GPa or less.

The hardness $H_{AC}$ of the laminated film irradiated with an active energy ray having an integral light quantity of 2000 mJ/cm 2 (namely, a cured laminated film (formed article)) measured by a nanoindentation method from the optical interference layer side is preferably 0.25 GPa or more. The hardness $H_{AC}$ is preferably 0.7 GPa or less. Specifically, the hardness $H_{AC}$ is preferably 0.25 GPa or more and 0.7 GPa or less. The hardness of the laminated film cured after the specific heating treatment also satisfies the above range. The hardness $H_{AC}$ is particularly preferably 0.3 GPa or more. The hardness $H_{AC}$ may be 0.6 GPa or less.

The hardness $H_{AC}$ of the formed article is larger than the hardness $H_{BC}$ of the laminated film. In the present embodiment, when the hardness $H_{AC}$ is 0.25 GPa or more and 0.7 GPa or less, the hardness $H_{BC}$ satisfies 0.1 GPa or more and 0.5 GPa or less.

The hardnesses $H_{BC}$ and $H_{AC}$ are calculated based on a value measured by the nanoindentation method from the optical interference layer side of the laminated film or the formed article. The hardnesses $H_{BC}$ and $H_{AC}$ are measured under conditions which the surface state of the optical interference layer and the hardness of the transparent support substrate are hardly affected. That is, the hardnesses $H_{BC}$ and $H_{AC}$ are measured by pushing an indenter to the hard coat layer from the optical interference layer side. It can be said that the hardnesses $H_{BC}$ and $H_{AC}$ reflect the hardness of the uncured or cured hard coat layer. For example, the hardnesses $H_{BC}$ and $H_{AC}$ are measured at 1000 nm inside the surface of the optical interference layer.

The hardness by the nanoindentation method is determined by, for example, continuous stiffness measurement using a nanoindentation device. In the continuous stiffness measurement, a minute load (alternating current (AC) load) is applied to a sample in addition to a quasi-static test load (direct current (DC) load). Accordingly, the force applied to the sample slightly vibrates. Stiffness with respect to depth is calculated from the vibration component of the resulting displacement and the phase difference between the displacement and the load. Accordingly, a continuous profile of hardness can be obtained with respect to depth.

As the nanoindentation device, iMicro Nanoindenter manufactured by NANOMECHANICS, INC. can be used. For the continuous stiffness measurement, for example, Advanced Dynamic E and H. NMT method can be used. The load and stiffness can be calculated using iMicro-dedicated software. A load is applied to the sample by the indenter until the load reaches a maximum load of 50 mN. As the indenter, for example, a verkovich type diamond indenter is used. In the measurement and the calculation of stiffness, the Poisson's ratio of the objects to be measured (namely, the uncured hard coat layer and the uncured optical interference layer), the load, etc. may be appropriately set to appropriate values.

In the case where the hardness $H_{BC}$ is measured by the nanoindentation method and then a mark that agrees with the shape of the indenter used remains on the surface of the optical interference layer, it can be determined that the measured hardness $H_{BC}$ is not accurate. The phenomenon described above is considered to occur because the uncured hard coat layer is excessively soft. That is, the hardness measured is strongly affected not by the uncured hard coat layer but by the transparent support substrate. Thus, in the above case, the hardness $H_{BC}$ may be regarded as being less than 0.1 GPa.

(Abrasion Resistance)

From the viewpoint of visibility, it is desirable that the cured laminated film is superior in abrasion resistance. It is preferable that when the surface of the optical interference layer of the laminated film irradiated with an active energy ray having an integral light quantity of 2000 mJ/cm$^2$ is rubbed 3,000 times while applying a vertical load of 19.6 N per 4 cm$^2$, no scratch is visually recognized on the optical interference layer. In this case, decrease in visibility due to change in the appearance of the formed article is easily inhibited. The laminated film cured after being subjected to the specific heating treatment also has abrasion resistance satisfying the above condition.

"No scratch is visually recognized" means that no scratch can be visually observed. The "scratch" is, for example, roughness of the surface. As long as no scratches are visually observed, very slight scratches may be observed when the sample after an abrasion test is observed using a microscope at a magnification of 100 times.

The abrasion test is performed using a known method under the above conditions. In the abrasion test, a friction block to which a cotton cloth is fixed is usually used. This friction block applies a vertical load (specifically, 19.6 N per 4 cm 2) to the sample.

The laminated film may be subjected to the specific heating treatment before irradiation with an active energy ray. The laminated film may be subjected to heating treatment in an atmosphere at 150 to 190° C. for 30 to 60 seconds in addition to or instead of the specific heating treatment. Thanks to these heating treatments, the surface of the laminated film is smoothened by leveling, so that the abrasion resistance is easily further improved.

(Coefficient of Static Friction)

From the viewpoint of scratch resistance and abrasion resistance, it is desirable that the coefficient of static friction of the cured laminated film is small. The coefficient of static friction LAC of the optical interference layer of the laminated film irradiated with an active energy ray having an integral light quantity of 2000 mJ/cm 2 is preferably 0.3 or less, more preferably 0.25 or less, and particularly preferably 0.20 or less. The coefficient of static friction is measured in accordance with JIS K 7125. The coefficient of static friction of the laminated film cured after the specific heating treatment also satisfies the above range.

The optical interference layer is laminated in an uncured state with the uncured hard coat layer. Furthermore, the laminated film is subjected to various processing in an uncured state. Thus, the optical interference layer is required to have high hardness in addition to antireflection performance, to have low tack and be less likely to be polluted, to be inhibited from damage and change in appearance during processing, to be inhibited from curling due to the difference in thermal shrinkage from other layers, etc. In particular, the optical interference layer is required to have superior antireflection performance, low tack and resistance to pollution, and to be inhibited from damage during processing (for example, depressions such as suction marks and squeegee marks in the decoration step).

These requirements can be achieved by controlling the hardness, rigidity, smoothness, tackiness, etc. of the uncured optical interference layer. The physical properties of the uncured optical interference layer can be adjusted by the thickness thereof, the composition of the composition for forming the optical interference layer, etc.

The hard coat layer is also laminated in an uncured state with the uncured optical interference layer. Furthermore, as described above, the laminated film is subjected to various processing in an uncured state. Thus, similar to the optical interference layer, the uncured hard coat layer is required to have high hardness, to have low tack and be less likely to be polluted, to inhibit damage and change in appearance (for example, foaming or cracking in the preforming step) during processing, and to inhibit curling due to a difference in thermal shrinkage from other layers, etc.

These requirements can be achieved by controlling the hardness, rigidity, smoothness, tackiness, etc. of the uncured hard coat layer. The physical properties of the uncured hard coat layer can be adjusted by the thickness thereof, the composition of the composition for forming the hard coat layer, etc.

In the following, the transparent support substrate and each layer included in the laminated film of the present embodiment will be further described.

[Transparent Support Substrate]

The transparent support substrate is not particularly limited as long as it is transparent. To be transparent specifically means that the total light transmittance is 80% or more. The total light transmittance of the transparent support substrate is 80% or more, and preferably 90% or more. The total light transmittance can be measured by a method in accordance with JIS K 7361-1. As the transparent support substrate, those known in the art are used without particular limitation. The transparent support substrate may be either colorless or colored.

The transparent support substrate is appropriately selected according to the application. Examples of the transparent support substrate include polyester films such as polycarbonate (PC), polyethylene terephthalate and polyethylene naphthalate; cellulose films such as diacetylcellulose and triacetylcellulose; acrylic films such as polymethyl methacrylate (PMMA); styrene films such as polystyrene and acrylonitrile-styrene copolymers; olefin films such as polyvinyl chloride, polyethylene, polypropylene, polyolefin having a cyclic or norbornene structure, and ethylene-propylene copolymers; and amide films such as nylon and aromatic polyamide. Further, the transparent support substrate may be a film comprising a resin such as polyimide, polysulfone, polyether sulfone, polyether ether ketone, polyphenylene sulfide, polyvinyl alcohol, polyvinylidene chloride, polyvinyl butyral, polyallylate, polyoxymethylene, and epoxy resin, or may be a film comprising a blend of those polymers.

The transparent support substrate may be a laminate of a plurality of films. For example, the transparent support substrate may be a laminate made up of a film made of an acrylic resin and a film made of a polycarbonate resin.

The transparent support substrate may have either optical anisotropy or isotropy. The magnitude of birefringence of the transparent support substrate having optical anisotropy is not particularly limited. The phase difference of the transparent support substrate having anisotropy may be ¼ of the wavelength (λ/4) or may be ½ of the wavelength (λ/2).

[Uncured Optical Interference Layer]

The uncured optical interference layer comprises an active energy ray-curable composition for forming an optical interference layer, which hereinafter may be referred to as composition R. The composition R is cured by active energy rays. By adjusting the integral light quantity of the active energy ray, the hardness and/or the stretch ratio of the optical interference layer can be controlled. The active energy ray is an ionizing radiation such as an ultraviolet ray, an electron beam, an $\alpha$ ray, a $\beta$ ray, or a $\gamma$ ray. In particular, the composition R is preferably of an ultraviolet-curable type.

The optical interference layer functions as a layer having a low refractive index. The refractive index of the cured optical interference layer is, for example, 1.20 or more and 1.55 or less, and may be 1.25 or more and 1.50 or less, and may be 1.30 or more and 1.45 or less. Accordingly, good antireflection property is exhibited.

<<Composition for Forming an Optical Interference Layer>>

The composition for forming an optical interference layer (composition R) comprises, for example, a first layer-forming component and low-refractive particles. The low-refractive particles are particles having a low refractive index, and reduce the refractive index of the optical interference layer.

<Low-Refractive Particles>

Examples of the low-refractive particles include hollow silica fine particles and hollow resin particles. The low-refractive particles can lower the refractive index of the optical interference layer while maintaining the strength of the layer. The low-refractive particles are of a structure in which the inside thereof is filled with a gas and/or a porous structure containing a gas. The refractive index is lowered in inverse proportion to the occupancy of the gas. Thus, the low-refractive particles have a lower refractive index than the refractive index of particles having no hollow.

As the low-refractive particles, silica fine particles in which a nanoporous structure is formed on at least part of the inside and/or the surface may be used. The nanoporous structure is formed according to the form, structure, and aggregation state of the silica fine particles and the dispersion state inside the coating film of the silica fine particles.

The volume average particle size (primary particle size) of the low-refractive particles is preferably not less than 50 nm and not more than 200 nm. The thickness of the optical interference layer is designed in consideration of the volume average particle size (primary particle size) and the like of the low-refractive particles. Specifically, the optical interference layer is designed to be thicker than the volume average particle size of the low-refractive particles. Accordingly, the low-refractive particles are less likely to be exposed on the surface of the optical interference layer, falling off of the low-refractive particles from the optical interference layer when the surface of the optical interference layer is rubbed is inhibited, and abrasion resistance is easily improved.

The content of the low-refractive particles is preferably 20 parts by mass or more, more preferably 30 parts by mass or more, and particularly preferably 40 parts by mass or more based on 100 parts by mass of the solid content of the composition R. Accordingly, the optical interference layer is likely to exhibit superior antireflection property. The content of the low-refractive particles is preferably 80 parts by mass or less, more preferably 75 parts by mass or less, and particularly preferably 70 parts by mass or less based on 100 parts by mass of the solid content of the composition R.

<First Layer-Forming Component>

The first layer-forming component comprises a first reactive component having two or more polymerizable functional groups in one molecule. The first reactive component comprises at least one selected from the group consisting of a first monomer, a first oligomer, and a first polymer. The weight-average molecular weights of the first monomer and the first oligomer are 10,000 or less, and may be 9000 or less. The weight-average molecular weight of the first polymer is more than 10,000, and may be 20,000 or more. The weight-average molecular weight of the first polymer may be 100,000 or less.

The weight-average molecular weight (Mw) can be calculated based on the molecular weight of standard polystyrene from a chromatogram measured by gel permeation chromatography.

From the viewpoint of adhesion to the uncured hard coat layer and transparency, the first reactive component preferably comprises a (meth)acrylate compound. Examples of the (meth)acrylate compound include acrylic (meth)acrylate compounds such as an acrylic (meth)acrylate monomer, an acrylic (meth)acrylate oligomer, and an acrylic (meth)acrylate polymer; urethane (meth)acrylate compounds such as a urethane (meth)acrylate monomer, a urethane (meth)acrylate oligomer, and a urethane (meth)acrylate polymer; and silicon (meth)acrylate compounds such as a silicon (meth)acrylate, a silicon (meth)acrylate oligomer, and a silicon (meth)acrylate polymer. These are used singly or two or more of them are used in combination. "(Meth)acrylate" means acrylate and/or methacrylate.

The acryl equivalents of the first monomer and the first oligomer are not particularly limited. From the viewpoint of reactivity, the acryl equivalents of the first monomer and the first oligomer are preferably 100 g/eq. or more, more preferably 110 g/eq. or more, and particularly preferably 115 g/eq. or more. The acryl equivalents of the first monomer and the first oligomer may be 200 g/eq. or less, 180 g/eq. or less, or 160 g/eq. or less.

Examples of the (meth)acrylate monomer, which is a starting material of the (meth)acrylate polymer include methyl (meth)acrylate, ethyl (meth)acrylate, n-butyl (meth) acrylate, isobutyl (meth)acrylate, 2-ethylhexyl (meth)acrylate, acrylic acid, methacrylic acid, isostearyl (meth)acrylate, ethoxylated o-phenylphenol acrylate, methoxypolyethylene glycol acrylate, methoxypolyethylene glycol acrylate, phenoxypolyethylene glycol acrylate, 2-acryloyloxyethyl succinate, 2-hydroxyethyl (meth)acrylate, 2-hydroxypropyl (meth)acrylate, ethylene glycol mono (meth)acrylate, propylene glycol mono(meth)acrylate, 2-hydroxy-3-methoxypropyl (meth)acrylate, dipentaerythritol hexaacrylate (DPHA), pentaerythritol (tri/tetra)acrylate (PETA), N-methylol(meth)acrylamide, and N-hydroxy (meth)acrylamide.

Examples of the acrylic (meth)acrylate oligomer or polymer include a polymer of at least one of the (meth)acrylate monomers described above.

The urethane (meth)acrylate monomer or oligomer can be prepared, for example, by reacting a polycarbonate diol, a (meth)acrylate compound containing a hydroxyl group and an unsaturated double bond group in the molecule thereof, and a polyisocyanate.

Examples of the urethane (meth)acrylate polymer include a polymer of at least one of the above-mentioned urethane (meth)acrylate monomers and oligomers.

The silicon (meth)acrylate compound is a (meth)acrylate compound having a siloxane linkage. Although it should not be construed as being limited to a particular theory, the silicon (meth)acrylate compound makes it possible to reduce the surface tension of the uncured optical interference layer, improve the leveling property, and reduce the tackiness.

From the viewpoints of improvement in abrasion resistance and antifouling property, reduction in refractive index, and the like, the first reactive component (typically, a (meth)acrylate compound) may contain a fluorine atom. The first layer-forming component may comprise a non-reactive component having less than two polymerizable functional groups in one molecule.

The mix of phases is considered to occur mainly as a result of thermally caused diffusion of a monomer and/or an oligomer having a small molecular weight contained in the hard coat layer and reaching of the monomer and/or the oligomer to the optical interference layer. The low-refractive particles can inhibit the thermally caused diffusion of the monomer and/or the oligomer from the hard coat layer to the optical interference layer. On the other hand, the first polymer has a small effect of inhibiting the thermally caused diffusion of the monomer and/or the oligomer from the hard coat layer to the optical interference layer.

From the viewpoint of inhibiting the mix of phases, it is desirable to reduce the content ratio of the first polymer and increase the content ratio of the low-refractive particles. For example, the composition R preferably contains the first polymer such that the content X of the low-refractive particles and the content Z of the first polymer satisfy the following relationship:

$100 \times Z/(X+Z) < 40(\%)$. It is more preferable to satisfy the relationship of $100 \times Z/(X+Z) \leq 35(\%)$, and particularly preferable to satisfy the relationship of $100 \times Z/(X+Z) \leq 30(\%)$.

In particular, when the low-refractive particles are contained in an amount of 30% by mass or more based on the total amount of the first oligomer, the first monomer, the first polymer, and the low-refractive particles ($X \geq 30$), the content X of the low-refractive particles, the total content Y of the first oligomer and the first monomer, and the content Z of the first polymer satisfy the relationship:

$X+Y+Z=100$, $Y \geq 0$, $Z \geq 0$, and $Z \leq \frac{1}{2}X - 15$. Accordingly, the mix of phases is more easily prevented. It is more preferable to satisfy the relationship of $Z \leq \frac{1}{2}X-18$, and particularly preferable to satisfy the relationship of $Z \leq \frac{1}{2}X-20$.

The first monomer and/or the first oligomer has a slightly smaller effect of inhibiting the mix of phases as compared with the low-refractive particles, but is important in terms of improving various physical properties of the cured laminated film (formed article).

<Inorganic Oxide Fine Particles>

The composition R may comprise inorganic oxide fine particles. The inorganic oxide fine particles inhibit volume shrinkage of the uncured optical interference layer and easily increase rigidity. Thus, change in appearance during the process of producing the uncured optical interference layer is easily inhibited. Furthermore, change in appearance of the cured optical interference layer and occurrence of curling are also prevented. In addition, the tackiness of the cured optical interference layer is reduced and the abrasion resistance is easily improved.

The content of the inorganic oxide fine particles is preferably 1 part by mass or more, more preferably 5 parts by mass or more, and particularly preferably 7 parts by mass or more based on 100 parts by mass of the solid content of the composition R. The content of the inorganic oxide fine particles is preferably 20 parts by mass or less, more preferably 18 parts by mass or less, and particularly preferably 15 parts by mass or less based on 100 parts by mass of the solid content of the composition R.

The solid content of the composition R is the total components of the composition R excluding the solvent. The same applies to the solid content of the composition for forming a hard coat layer.

The inorganic oxide fine particles are not particularly limited. Examples of the inorganic oxide fine particles include silica ($SiO_2$) particles (excluding hollow particles), alumina particles, titania particles, tin oxide particles, antimony-doped tin oxide (ATO) particles, and zinc oxide particles. The surface of the inorganic oxide fine particles may be modified with a functional group containing an unsaturated double bond. The functional group is desirably a (meth)acryloyl group. Among them, silica particles and alumina particles are preferable from the viewpoint of cost and coating material stability, and in particular, silica particles and alumina particles whose surfaces are modified with a functional group are preferable. The form of the inorganic oxide fine particles may be sol.

The average particle size of the inorganic oxide fine particles is not particularly limited. From the viewpoint of transparency and coating material stability, the average particle size of the inorganic oxide fine particles is preferably 5 nm or more and 100 nm or less. The average particle size of the inorganic oxide fine particles is a value measured using image processing software from an image of a cross section taken with an electron microscope. The average particle size of other granular materials is also determined by the same method.

<Photoinitiator>

The composition R preferably comprises a photoinitiator. Accordingly, polymerization of the active energy ray-curable resin component easily proceeds.

Examples of the photoinitiator include alkylphenone-based photoinitiators, acylphosphine oxide-based photoinitiators, titanocene-based photoinitiators, and oxime ester-based polymerization initiators.

Examples of the alkylphenone-based photoinitiator include 2,2-dimethoxy-1,2-diphenylethan-1-one, 1-hydroxy-cyclohexyl-phenyl-ketone, 2-hydroxy-2-methyl-1-phenyl-propan-1-one, 1-[4-(2-hydroxyethoxy)-phenyl]-2- hydroxy-2-methyl-1-propan-1-one, 2-hydroxy-1-{4-[4-(2-hydroxy-2-methyl-propionyl)-benzyl]phenyl}-2-methyl-propan-1-one, 2-methyl-1-(4-methylthiophenyl)-2-morpholinopropan-1-one, 2-benzyl-2-dimethylamino-1-(4-morpholinophenyl)butanone-1, and 2-(dimethylamino)-2-[(4-methylphenyl)methyl]-1-[4-(4-morpholinyl)phenyl]-1-butanone.

Examples of the acylphosphine oxide-based photoinitiators include 2,4,6-trimethylbenzoyl-diphenyl-phosphine oxide and bis(2,4,6-trimethylbenzoyl)-phenylphosphine oxide.

Examples of the titanocene-based photoinitiators include bis($\eta$5-2,4-cyclopentadien-1-yl)-bis(2,6-difluoro-3-(1H-pyrrol-1-yl)-phenyl)titanium.

Examples of the oxime ester-based polymerization initiator include 1,2-octanedione, 1-[4-(phenylthio)-, 2-(O-benzoyloxime)], ethanone, 1-[9-ethyl-6-(2-methylbenzoyl)-9H-carbazol-3-yl]-, 1-(O-acetyloxime), oxyphenylacetic acid, 2-[2-oxo-2-phenylacetoxyethoxy]ethyl ester, and 2-(2-hydroxyethoxy)ethyl ester. These photoinitiators are used singly or two or more of them are used in combination.

Among them, preferred is at least one selected from the group consisting of 2-hydroxy-2-methyl-1-phenyl-propan-1-one, 1-hydroxy-cyclohexyl-phenyl-ketone, 2-methyl-1-(4-methylthiophenyl)-2-morpholinopropan-1-one, 2-benzyl-2-dimethylamino-1-(4-morpholinophenyl)-butanone-1, and 2,2-dimethoxy-1,2-diphenylethan-1-one.

The content of the photoinitiator is preferably 0.01 parts by mass or more, more preferably 1 part by mass or more, and particularly preferably 3 parts by mass or more based on 100 parts by mass of the solid content of the composition R. The content of the photoinitiator is preferably 10 parts by mass or less, more preferably 7 parts by mass or less, and particularly preferably 5 parts by mass or less based on 100 parts by mass of the solid content of the composition R.

<Solvent>

The composition R may contain a solvent. The solvent is not particularly limited, and is appropriately selected in consideration of the components contained in the composition, the type of the transparent support substrate, the application method, etc.

Examples of the solvent include aromatic solvents such as toluene and xylene; ketone solvents such as methyl ethyl ketone, acetone, methyl isobutyl ketone, and cyclohexanone; ether solvents such as diethyl ether, isopropyl ether, tetrahydrofuran, dioxane, ethylene glycol dimethyl ether, ethylene glycol diethyl ether, diethylene glycol dimethyl ether, diethylene glycol diethyl ether, propylene glycol monomethyl ether, anisole, and phenetole; ester solvents such as ethyl acetate, butyl acetate, isopropyl acetate, and ethylene glycol diacetate; amide solvents such as dimethylformamide, diethylformamide, and N-methylpyrrolidone; cellosolve solvents such as methyl cellosolve, ethyl cellosolve, and butyl cellosolve; alcohol solvents such as methanol, ethanol, propanol, isopropyl alcohol, butanol, and isobutyl alcohol; and halogen-containing solvents such as dichloromethane and chloroform. These solvents are used singly or two or more of them are used in combination. Among them, ester solvents, ether solvents, alcohol solvents, and ketone solvents are preferable.

Others

The composition R may comprise various additives, as necessary. Examples of the additives include antistatic agents, plasticizers, surfactants, antioxidants, ultraviolet absorbers, surface conditioning agents, surface modifiers, leveling agents, and light stabilizers (e.g., hindered amine light stabilizer (HALS)).

The content of each additive is preferably 1 part by mass or more, more preferably 3 parts by mass or more, and particularly preferably 5 parts by mass or more based on 100 parts by mass of the solid content of the composition R. The content of each additive is preferably 20 parts by mass or less, and more preferably 15 parts by mass or less based on 100 parts by mass of the solid content of the composition R.

[Uncured Hard Coat Layer]

The uncured hard coat layer contains an active energy ray-curable composition for forming a hard coat layer, which hereinafter may be referred to as composition HC. The composition HC is cured by active energy rays. By adjusting the integral light quantity of the active energy ray, the hardness and/or the stretch ratio of the hard coat layer can be controlled. The composition HC is preferably cured by the same type of active energy ray as the composition R.

<<Composition for Forming a Hard Coat Layer>>

The composition for forming a hard coat layer (composition HC) comprises a second layer-forming component.

<Second Layer-Forming Component>

The second layer-forming component comprises a second reactive component having two or more polymerizable functional groups in one molecule. The second reactive component preferably comprises at least one of a second monomer and a second oligomer. Accordingly, the cross-linking density of the second layer-forming component is increased, and the hardness of the cured hard coat layer is easily improved. The weight-average molecular weights of the second monomer and the second oligomer are 10,000 or less, and may be 9000 or less.

The total content of the second oligomer and the second monomer is preferably 25 parts by mass or more and 65 parts by mass or less based on 100 parts by mass of the solid content of the composition HC. When the total content of the second oligomer and the second monomer is 25 parts by mass or more based on 100 parts by mass of the solid content of the composition HC, the hardness $H_{BC}$ is easily controlled to 0.5 GPa or less. Thus, the adhesion between the uncured hard coat layer and the uncured optical interference layer is facilitated. Furthermore, in laminating the uncured hard coat layer and the uncured optical interference layer, entry of air between the layers (air entrapment) is easily inhibited. The total content of the second oligomer and the second monomer is preferably 28 parts by mass or more, and more preferably 30 parts by mass or more based on 100 parts by mass of the solid content of the composition HC.

When the total content of the second oligomer and the second monomer is 65 parts by mass or less based on 100 parts by mass of the solid content of the composition HC, the hardness $H_{BC}$ is easily controlled to 0.1 GPa or more. Thus, such defects as depressions or damages to be formed at the time of slit formation and cutting, depressions to be formed due to foreign matters mixed when a plurality of laminated films are laminated, squeegee marks, and suction marks are inhibited, so that the yield is likely to improve. The total content of the second oligomer and the second monomer is preferably 62 parts by mass or less, and more preferably 60 parts by mass or less based on 100 parts by mass of the solid content of the composition HC.

From the viewpoint of being able to control the tackiness of the uncured hard coat layer, the second reactive component preferably comprises a second polymer having a weight-average molecular weight of more than 10,000 together with the second monomer and/or the second oligomer. The weight-average molecular weight of the second polymer is more than 10,000, and may be 20,000 or more. The weight-average molecular weight of the second polymer may be 100,000 or less.

Examples of a preferable second reactive component include the same (meth)acrylate compounds as those recited as examples as the first reactive component. From the viewpoint of adhesion to the transparent support substrate and the optical interference layer and transparency, the second reactive component preferably comprises a (meth)acrylate compound.

<Inorganic Oxide Fine Particles>

The composition HC may comprise inorganic oxide fine particles. Examples of the inorganic oxide fine particles include those recited as examples for the composition R. The content of the inorganic oxide fine particles is preferably 20 parts by mass or less, more preferably 18 parts by mass or less, and particularly preferably 15 parts by mass or less based on 100 parts by mass of the solid content of the composition HC. The content of the inorganic oxide fine particles is preferably 0.1 parts by mass or more, more preferably 1 part by mass or more, and particularly preferably 3 parts by mass or more based on 100 parts by mass of the solid content of the composition HC.

<Photoinitiator>

The composition HC preferably comprises a photoinitiator. Accordingly, polymerization of the active energy ray-curable resin component easily proceeds. Examples of the photoinitiator include those recited as examples for the composition R.

Among them, preferred is at least one selected from the group consisting of 2-hydroxy-2-methyl-1-phenyl-propan-1-one, 1-hydroxy-cyclohexyl-phenyl-ketone, 2-methyl-1-(4-methylthiophenyl)-2-morpholinopropan-1-one, 2-benzyl-2-dimethylamino-1-(4-morpholinophenyl)-butanone-1, and 2,2-dimethoxy-1,2-diphenylethan-1-one.

The amount of the photoinitiator is preferably 0.01 parts by mass or more and 10 parts by mass or less, and more preferably 1 part by mass or more and 10 parts by mass or less, per 100 parts by mass of the solid content of the composition HC.

<Solvent>

The composition HC may comprise a solvent. The solvent is not particularly limited, and is appropriately selected in consideration of the components contained in the composition, the type of the transparent support substrate, the application method, etc. Examples of the solvent include those recited as examples for the composition R. Among them, ester solvents, ether solvents, alcohol solvents, and ketone solvents are preferable.

<Others>

The composition HC may comprise various additives, as necessary. Examples of the additives include those recited as examples for the composition R.

The resin components of the composition HC and the composition R may be the same or different. Among them, both resin components are preferably the same or the same type. This is because adhesion between the uncured hard coat layer and the uncured optical interference layer is improved, and delamination between the layers hardly occurs.

[Uncured Functional Layer]

The laminated film may further have at least one uncured functional layer between the uncured hard coat layer and the uncured optical interference layer. The functional layer reinforces the optical function of the laminated film or imparts a new optical function.

The functional layer may be another optical interference layer having optical characteristics different from those of the above-described optical interference layer. The functional layer may be a combination of two or more other optical interference layers having characteristics different from those of the optical interference layer.

A preferable functional layer is, for example, at least one of an optical interference layer having a high refractive index and an optical interference layer having a medium refractive index. The refractive index of the high refractive index layer may be, for example, more than 1.55 and 2.00 or less. The refractive index of the medium refractive index layer is not particularly limited as long as it is between the optical interference layer (the low refractive index layer) and the high refractive index layer. The refractive index of the medium refractive index layer may be, for example, 1.55 or more and 1.75 or less.

The thickness of the other optical interference layer is not particularly limited. The thickness per layer of the other optical interference layer may be 10 nm or more and 300 nm or less. The thickness per layer of the optical interference layer is preferably 15 nm or more, more preferably 20 nm or more, and particularly preferably 40 nm or more. The thickness per layer of the optical interference layer is preferably 200 nm or less, more preferably 180 nm or less, and particularly preferably 150 nm or less.

The composition for forming a functional layer that forms the functional layer may comprise the same components as those contained in the composition HC or the composition R described above. The composition for forming a functional layer that forms the other optical interference layer may comprise the same components as those contained in the composition R. The composition for forming a functional layer that forms the other optical interference layer may comprise high-refractive particles. The components contained in the plurality of functional layers may be either the same or different.

The high refractive index layer and the medium refractive index layer may comprise a resin component other than the active energy ray-curable type. Examples of the other resin components include thermoplastic resins such as alkyd resins, polyester resins, and acrylic resins; thermosetting resins such as epoxy resins, phenol resins, melamine resins, urethane resins, and silicon resins; and polyisocyanates.

[Protective Film]

The laminated film may have a protective film on a surface of the uncured optical interference layer on a side opposite from the uncured hard coat layer. Accordingly, damage is easily inhibited when the laminated film is wound into a roll or unwound from a roll.

The protective film protects the optical interference layer and the laminated film, and functions as a release paper for forming the composition R into a film form. The protective film may have an adhesive layer on the application surface.

Protective films known in the art are used without particular limitation. The protective film may be either colorless or colored. The protective film may be transparent.

The thickness of the protective film is not particularly limited. The thickness of the protective film may be 20 μm or more and 100 μm or less. Accordingly, the effect of protecting the uncured optical interference layer is easily enhanced. The thickness of the protective film is preferably 25 μm or more, more preferably 30 μm or more, even more preferably 33 μm or more, and particularly preferably 35 μm or more. The thickness of the protective film is preferably 85 μm or less, more preferably 80 μm or less, and particularly preferably 65 μm or less. The thickness of the protective film is a value that does not include the thickness of the adhesive layer.

The protective film is made of, for example, resin. Examples of the resin film include polyolefin films such as polyethylene films and polypropylene films (including an unoriented polypropylene film (CPP film) and a biaxially oriented polypropylene film (OPP film)), modified polyolefin films obtained by modifying these polyolefins to add further functions, polyester films such as polyethylene terephthalate, polycarbonate and polylactic acid, polystyrene resin films such as polystyrene films, AS resin films and ABS resin films, nylon films, polyamide films, polyvinyl chloride films and polyvinylidene chloride films, and polymethylpentene films.

Additives such as an antistatic agent and an ultraviolet inhibitor may be added to the resin film, as necessary. The surface of the resin film may have been subjected to corona treatment or low-temperature plasma treatment.

Among them, at least one selected from among a polyethylene film, a polystyrene film, a modified polyolefin film, a polymethylpentene film, an OPP film, and a CPP film is preferable.

In particular, at least one selected from among a polyethylene film, a polystyrene film, a modified polyolefin film, a polymethylpentene film, an OPP film, and a CPP film each having a thickness of not less than 30 μm and not more than 100 is preferable.

FIG. 1 is a cross-sectional view schematically showing a laminated film according to the present embodiment. The laminated film 10 includes a transparent support substrate 11, an uncured hard coat layer 12 disposed on one main surface of the transparent support substrate, and an uncured optical interference layer 13 formed on the uncured hard coat layer 12.

B. Formed Article

The formed article according to the present embodiment is obtained by curing the laminated film. The formed article is a completely cured product of the laminated film. The formed article includes a transparent support substrate, a cured hard coat layer, and a cured optical interference layer. The formed article may further have at least one cured functional layer between the cured hard coat layer and the cured optical interference layer. The formed article may or may not further have a protective film. The protective film is used depending on the intended purpose of use.

The formed article is obtained, for example, by irradiating the laminated film with an active energy ray having an integral light quantity of 200 mJ/cm 2 to cure the uncured hard coat layer and the uncured optical interference layer.

The formed article is particularly suitable as a protective material for a display and various sensors disposed around the display. Examples of the display include a liquid crystal display, an organic EL display, and a plasma display. The formed article is particularly suitable as a protective material for a touch panel display for vehicles and devices disposed around the display. The formed article is disposed such that the optical interference layer is outside the hard coat layer.

[Decorative Layer]

The formed article may further comprise a decorative layer. The laminated film according to the present embodiment can maintain a low reflectance even when heating treatment is applied at the time of forming the decorative layer. When the formed article is a protective material for a display, the decorative layer is provided, for example, in a bezel part surrounding the display.

The formed article includes, for example, a transparent support substrate, a hard coat layer and an optical interference layer disposed on one main surface of the transparent support substrate, and a decorative layer disposed on the other main surface of the transparent support substrate. The decorative layer may be provided on a part of the other main surface of the transparent support substrate. The decorative layer is a layer that provides decoration, such as a pattern, characters, or metallic luster, to the formed article. By the decorative layer, the designability of the formed article is enhanced.

Examples of the decorative layer include at least one of a print layer and a vapor-deposited layer. Each of the print layer and the vapor-deposited layer has one or more layers, and may comprise a plurality of layers. The thickness of the decorative layer is not particularly limited, and is appropriately set according to designability, etc.

In the print layer, for example, a wood grain pattern, a stone grain pattern, a cloth grain pattern, a sand grain pattern, a geometric pattern, characters, or a solid print is drawn. The print layer is formed of, for example, a coloring ink comprising a binder resin and a colorant. The binder resin is not particularly limited. Examples of the binder resin include polyvinyl-based resins including vinyl chloride/vinyl acetate-based copolymers, polyamide-based resins, polyester-based resins, polyacrylic resins, polyurethane-based resins, polyvinyl acetal-based resins, polyester urethane-based resins, cellulose ester-based resins, alkyd resins, and chlorinated polyolefin-based resins.

The colorant is not particularly limited, and examples thereof include known pigments and dyes. Examples of a yellow pigment include azo-based pigments such as polyazo pigments, organic pigments such as isoindolinone, and inorganic pigments such as titanium nickel antimony oxide. Examples of a red pigment include azo-based pigments such as polyazo pigments, organic pigments such as quinacridone, and inorganic pigments such as rouge. Examples of a blue pigment include organic pigments such as phthalocyanine blue and inorganic pigments such as cobalt blue. Examples of a black pigment include organic pigments such as aniline black. Examples of a white pigment include inorganic pigments such as titanium dioxide.

The vapor-deposited layer is formed of at least one metal selected from the group comprising aluminum, nickel, gold, platinum, chromium, iron, copper, indium, tin, silver, titanium, lead and zinc or an alloy or compound thereof

[Formed Resin Layer]

The formed article may further comprise a formed resin layer. The formed resin layer supports the hard coat layer and the optical interference layer together with the transparent support substrate. The formed article includes, for example, a transparent support substrate, a hard coat layer and an optical interference layer disposed on one main surface of the transparent support substrate, and a formed resin layer disposed on the other main surface of the transparent support substrate. The shape of the formed resin layer is not limited. Thus, the degree of freedom of the design of the formed article is increased.

The formed article may comprise a transparent support substrate, a hard coat layer and an optical interference layer disposed on one main surface of the transparent support substrate, a decorative layer disposed on the other main surface of the transparent support substrate, and a formed resin layer. In this case, the decorative layer is disposed so as to be sandwiched between the transparent support substrate and the formed resin layer.

The resin that forms the formed resin layer is not particularly limited. The formed resin layer comprises, for example, a thermosetting resin and/or a thermoplastic resin. Examples of the thermosetting resin include phenol resin, epoxy resin, melamine resin, urea resin, unsaturated polyester, and thermosetting polyimide. Examples of the thermoplastic resin include so-called engineering plastics. Examples of the engineering plastics include polyamide, polyacetal, polycarbonate, ultra-high molecular weight polyethylene, polysulfone, polyether sulfone, polyphenylene sulfide, and liquid crystal polymer.

Figure 2:
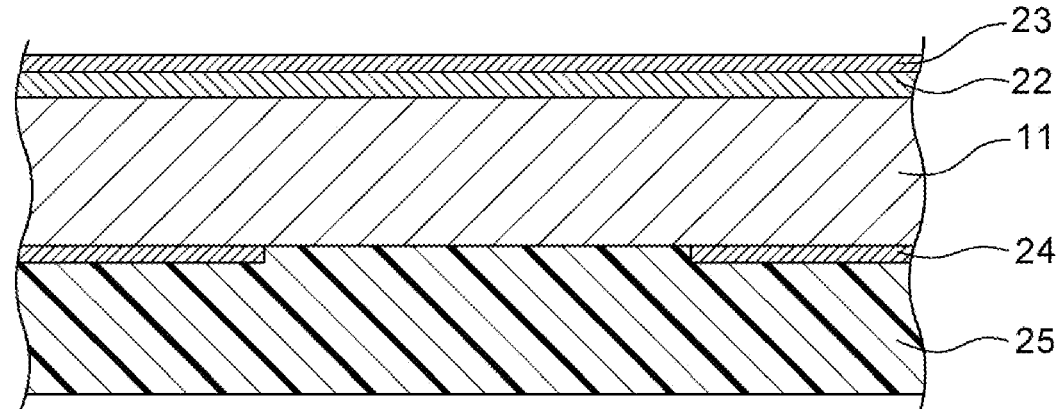
FIG. 2 is a cross-sectional view schematically showing a formed article according to one embodiment of the present invention.

FIG. 2 is a cross-sectional view schematically showing a formed article according to the present embodiment. The formed article 20 includes a transparent support substrate 11, a cured hard coat layer 22 disposed on one main surface thereof, a cured optical interference layer 23 formed on the hard coat layer 22, a decorative layer 24, and a formed resin layer 25. The decorative layer 24 is disposed to cover a part of the other main surface of the transparent support substrate 11. The formed resin layer 25 is disposed so as to cover the whole of the other main surface of the transparent support substrate 11 and the whole of the decorative layer 24.

C. Method for Manufacturing Laminated Film

The laminated film according to the present embodiment is manufactured by a method comprising a step of a step of forming an uncured hard coat layer by applying an active energy ray-curable composition for forming a hard coat layer to one surface of a transparent support substrate having a thickness of 50 μm or more and 600 μm or less; a step of forming an uncured optical interference layer by applying an active energy ray-curable composition for forming an optical interference layer to one surface of another support substrate; and a lamination step of bonding a surface of the uncured hard coat layer on a side opposite from the transparent support substrate and a surface of the uncured optical interference layer on a side opposite from the other support substrate to obtain a laminated film. Through laminating the uncured hard coat layer and the uncured optical interference layer by a lamination method, the mix of phases is easily inhibited. The stretch ratio of the resulting laminated film at 160° C. is 50% or more, and the minimum value $R_{AH}$ of the reflectance after the specific heating treatment is 2% or less.

Figure 3:
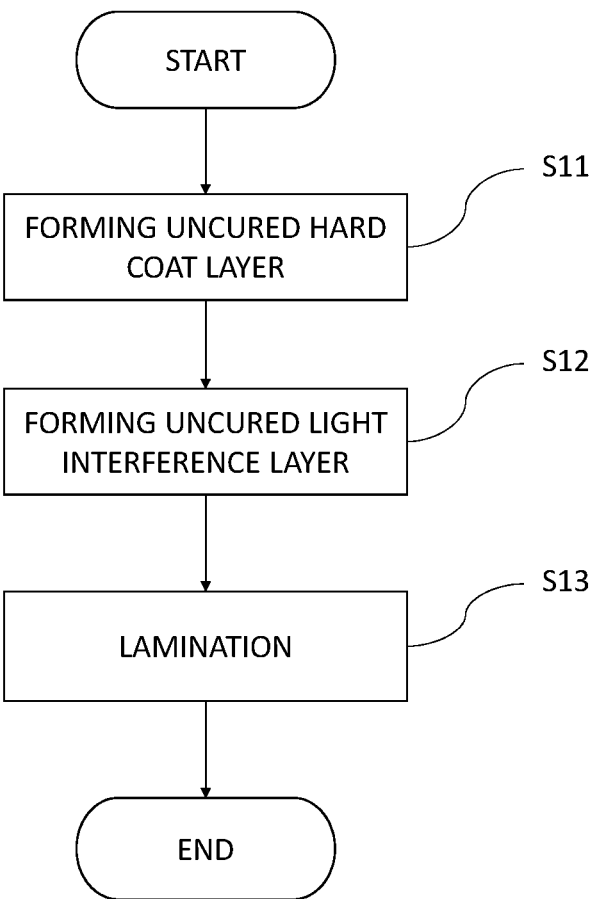
FIG. 3 is a flowchart showing a method for manufacturing a laminated film according to one embodiment of the present invention.

FIG. 3 is a flowchart showing the method for manufacturing a laminated film according to the present embodiment.

(1-1) Step of forming uncured hard coat layer (S11)

The method for forming the uncured hard coat layer is not particularly limited. The uncured hard coat layer is formed by, for example, applying the composition HC to one surface of the transparent support substrate.

The composition HC can be prepared by a method commonly practiced by those skilled in the art. For example, it can be prepared by mixing the above-described components by using a commonly used mixing device such as a paint shaker and a mixer.

The method of the application of the composition HC is not particularly limited, and the application is performed by a method usually performed by those skilled in the art. Examples of the application method include a dip coating method, an air knife coating method, a curtain coating method, a roller coating method, a bar coating method (for example, a wire bar coating method), a die coating method, an inkjet method, and a gravure coating method.

The amount of the composition HC applied is not particularly limited. The composition HC is applied such that, for example, the thickness of the uncured hard coat layer after drying is 2 μm or more and 30 μm or less.

After the application, a drying step may be performed. The drying conditions are not particularly limited, and are appropriately set such that at least part of the solvent contained in the composition HC is removed. Examples of the drying method include air drying (natural drying), heat drying, and vacuum drying. Among them, heat drying is preferable. By heating, the uncured hard coat layer can be leveled along with being dried. The drying is performed after the uncured hard coat layer is formed on the transparent support substrate and before the uncured hard coat layer is subjected to the lamination step. For example, the uncured hard coat layer is dried before the transparent support substrate provided with the uncured hard coat layer is carried into a lamination machine.

After the uncured hard coat layer is formed, the transparent support substrate may be wound into a roll form. Accordingly, roll-to-roll processing can be performed until the lamination step. Moreover, after a protective film is bonded to the surface of the uncured hard coat layer, the transparent support substrate may be wound. The protective film and the uncured hard coat layer may be bonded to each other with an adhesive layer interposed therebetween.

(1-2) Step of forming uncured optical interference layer (S12)

The method for forming the uncured optical interference layer is not particularly limited. The uncured optical interference layer is formed by, for example, applying the composition R onto one surface of another support substrate (typically, the protective film described above). The method for applying the composition R is performed by a technique that is usually performed by those skilled in the art, similarly to the composition HC.

The amount of the composition R applied is not particularly limited. The composition R is applied such that, for example, the thickness of the uncured optical interference layer after drying is 15 nm or more and 200 nm or less.

After the application, a drying step may be performed. The drying conditions are not particularly limited, and are appropriately set such that at least part of the solvent contained in the composition R is removed. Examples of the drying method include the same methods for the drying of the hard coat layer. Among them, heat drying is preferable. By heating, the uncured optical interference layer can be leveled along with being dried.

The drying is performed after the uncured optical interference layer is formed on the other support substrate and before the uncured optical interference layer is subjected to the lamination step. For example, the uncured optical interference layer is dried before the other support substrate provided with the uncured optical interference layer is carried into a lamination machine.

After the uncured optical interference layer is formed, the other support substrate may be wound into a roll form. Accordingly, roll-to-roll processing can be performed until the lamination step. Moreover, after a protective film is bonded to the surface of the uncured optical interference layer, the other support substrate may be wound. The protective film and the uncured optical interference layer may be bonded to each other with an adhesive layer interposed therebetween.

(1-3) Lamination Step (S13)

The uncured optical interference layer formed on the other support substrate and the uncured hard coat layer formed on the transparent support substrate are bonded. Accordingly, a laminated film is obtained. After both layers are bonded, the other support substrate may be peeled off.

In the case where the other support substrate with the uncured optical interference layer formed thereon has been wound, the transparent support substrate provided with the uncured hard coat layer is carried into a laminating machine, and the other support substrate wound is carried into the laminating machine while being unwound.

In the case where the transparent support substrate with the uncured hard coat layer formed thereon has been wound, the other support substrate provided with the uncured optical interference layer is carried into a laminating machine, and the transparent support substrate wound is carried into the laminating machine while being unwound.

The bonding is preferably performed while applying pressure. The pressure may be, for example, 0.1 N/cm or more and 50 N/cm or less. The pressure is preferably 0.5 N/cm or more. The pressure is preferably 30 N/cm or less.

The temperature of each layer at the time of bonding is not particularly limited. Since all the layers are uncured, the layers can be bonded at a low temperature. On the other hand, since the laminated film according to the present embodiment is likely to be inhibited from the occurrence of mix of phases, each layer may be heated at the time of bonding. The temperature of each layer at the time of bonding may be 0° C. or more and 100° C. or less.

A laminated film having an uncured functional layer between an uncured hard coat layer and an uncured optical interference layer is manufactured, for example, through the following steps.

First, another uncured functional layer is formed on a new support substrate. Subsequently, a surface of the uncured hard coat layer opposite from the transparent support substrate and a surface of the uncured functional layer opposite from the new support substrate are bonded to each other. The new support substrate is peeled off, and then the uncured optical interference layer supported by the other support substrate is bonded to the exposed uncured functional layer. If necessary, before bonding the optical interference layer, a step of bonding the uncured functional layer to the uncured hard coat layer or the uncured functional layer laminated thereon is repeated.

Accordingly, a laminated film including a transparent support substrate, an uncured hard coat layer, at least one uncured functional layer, an optical interference layer, and another support substrate in this order is obtained. The other support substrates may or may not be peeled off. After the lamination step, the laminated film may be wound into a roll. In this case, it is preferable that the other support substrate has not been peeled off.

Figure 4:
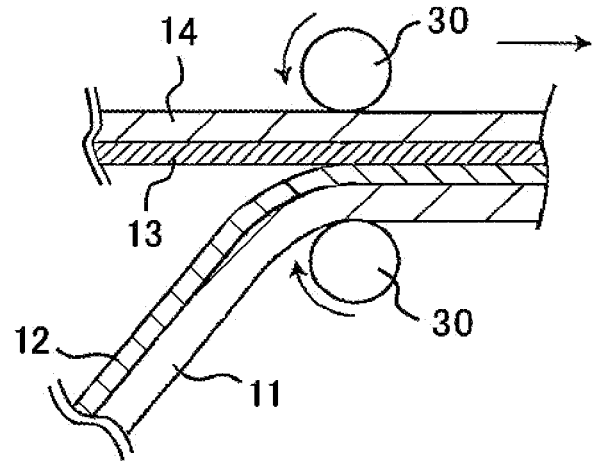
FIG. 4 is a schematic diagram for explaining a lamination step in a method for manufacturing a laminated film according to one embodiment of the present invention.

FIG. 4 is a schematic diagram for explaining a lamination step in a method for manufacturing a laminated film according to the present embodiment. An uncured hard coat layer 12 is formed on one surface of a transparent support substrate 11. This laminate is obtained in a step of forming the uncured hard coat layer. This laminate is conveyed in a flat state from the left side toward the right side in FIG. 4.

On the other hand, an uncured optical interference layer 13 is laminated on one surface of another support substrate 14. This laminate is obtained in the step of forming an uncured optical interference layer. This laminate is conveyed in a flat state from the left side toward the right side in FIG. 4.

While conveying these laminates, a surface of the uncured hard coat layer 12 opposite from the transparent support substrate 11 and a surface of the uncured optical interference layer 13 opposite from the other support substrate 14 are bonded to each other by application of pressure with a pair of rollers 30. Accordingly, a laminated film including the transparent support substrate 11, the uncured hard coat layer 12, the optical interference layer 13, and the other support substrate 14 in this order is obtained.

The dimensions in the depicted examples are merely an embodiment. The thickness and size of each layer and each substrate, the position, size, and the like of the rollers may be appropriately set.

D. Method for Manufacturing Formed Article

The formed article according to the present embodiment is manufactured, for example, by a method comprising: a decoration step of forming a decorative layer on the other main surface of the transparent support substrate of the laminated film; and a curing step of irradiating the laminated film with an active energy ray having an integral light quantity of 200 mJ/cm 2 or more after the decoration step. The decoration step includes a heating step of heating the laminated film at 80° C. or more for 20 minutes or more.

After the decoration step, an injection molding step, or a preforming step and an injection molding step are performed, as necessary. In the preforming step, the laminated film is formed into a shape conforming with a desired three-dimensional shape by thermoforming.

When the preforming step is performed, the curing step may be performed multiple times. For example, after the preforming step, a semi-curing step of irradiating part of the laminated film with an active energy ray may be performed. In this case, after the injection molding step, a main curing step of irradiating the laminated film with an active energy ray so as to cure the remaining part is performed.

Figure 5:
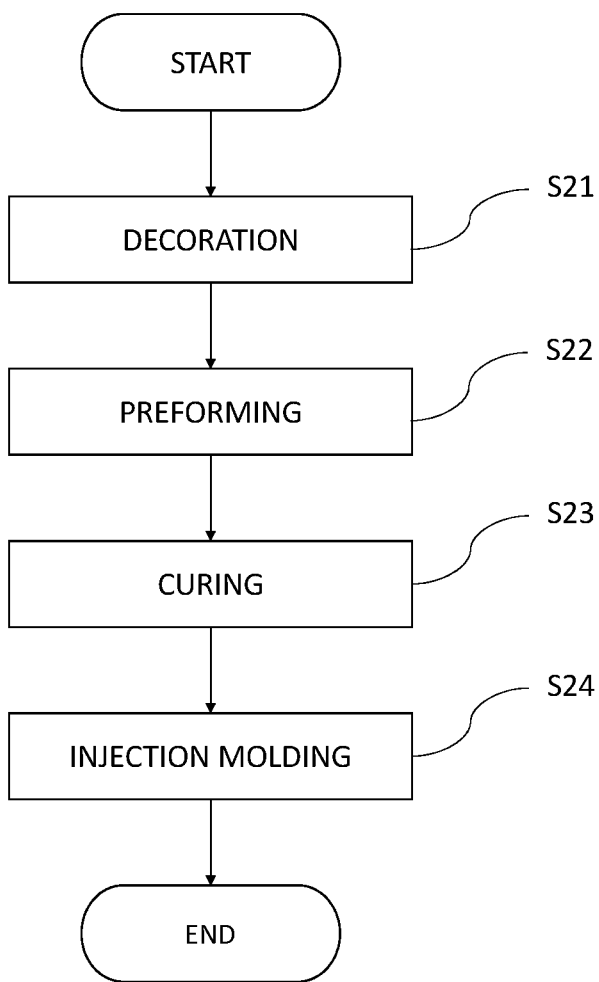
FIG. 5 is a flowchart showing a method for manufacturing a formed article according to one embodiment of the present invention.

That is, the formed article is manufactured, for example, by a method comprising a decoration step (S21), a preforming step (S22), a curing step (S23), and an injection molding step (S24) in this order. FIG. 5 is a flowchart showing a method of manufacturing a formed article according to the present embodiment.

Figure 6:
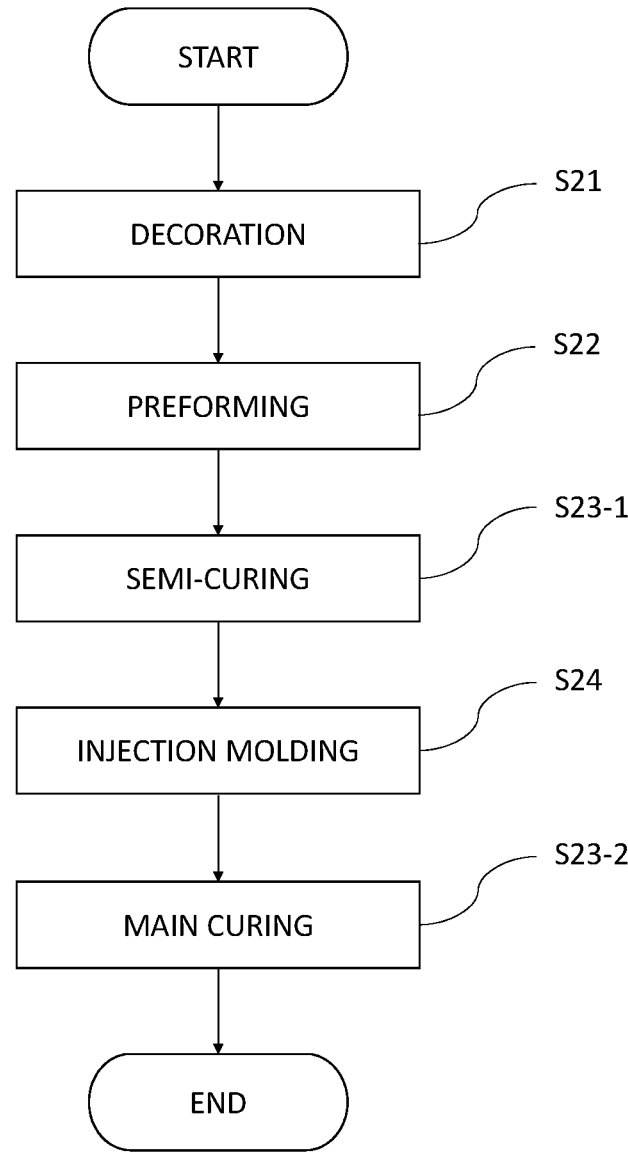
FIG. 6 is a flowchart showing a method for FIG. a formed article according to another embodiment of the present invention.

The formed article is manufactured by a method including, for example, a decoration step (S21), a preforming step (S22), a semi-curing step (S23-1), an injection molding step (S24), and a main curing step (S23-2) in this order. FIG. 6 is a flowchart showing a method of manufacturing another formed article according to the present embodiment.

When the laminated film has been wound into a roll, a step of unwinding the laminated film from the roll to form a slit or cut the laminated film into a desired shape and size may be performed before the decoration step.

In the following, the respective steps are described in detail.

(2-1) Decoration Step (S21)

A decorative layer (typically, a print layer and a vapor-deposited layer) is formed on the other main surface of the transparent support substrate of the laminated film.

The method for forming the print layer is not particularly limited. Examples of the method for forming the print layer include an offset printing method, a gravure printing method, a screen printing method, a roll coating method, and a spray coating method. The method for forming the vapor-deposited layer is also not particularly limited. Examples of the method for forming the vapor-deposited layer include a vacuum vapor deposition method, a sputtering method, an ion plating method, and a plating method.

The decoration step includes a heating step of heating the laminated film at 80° C. or more for 20 minutes or more. The heating step is performed, for example, for drying the decorative layer. In the present embodiment, even in the case of undergoing such a heating step, the resulting formed article has a low reflectance.

The decoration step may be performed a plurality of times while changing the color, for example. In the decoration step, heating at a temperature higher than 80° C. for 5 minutes or less, or heating at a temperature lower than 80° C. for 20 minutes or more may be further performed. Such heating does not significantly participate in the occurrence of mix of phases.

(2-2) Preforming Step (S22)

The laminated film is preformed into a shape conforming to a desired three-dimensional shape. By forming the laminated film into a shape close to a three-dimensional shape in advance, it becomes possible to perform injection molding (typically, insert-mold lamination (IML) molding). In IML molding, the laminated film is inserted into a mold, and a resin for molding is injected toward the laminated film. After the preforming step, a trimming step of removing unnecessary parts of the laminated film may be performed.

The method of preforming is not particularly limited. The preforming is performed by, for example, a vacuum molding method, an air-pressure molding method, or a vacuum pressure molding method. In the preforming, the mold and the laminated film are placed in the same processing chamber. The laminated film is placed such that the transparent support substrate faces the mold. The laminated film is heated and the processing chamber is brought into a vacuum state and/or a pressurized state. Accordingly, the laminated film is deformed along the mold. Next, the laminated film is cooled and then removed from the mold. In the preforming, the laminated film may be heated at 90° C. or more and 190° C. or less for 20 seconds or more and 5 minutes or less.

(2-3) Semi-Curing Step (S23-1)

An active energy ray is irradiated so that a part of the laminated film is cured. Accordingly a laminated film in a semi-cured state is obtained. By the semi-curing step, adhesion of the laminated film to the mold in the injection molding step is inhibited, and the laminated film is adjusted to a stretch ratio required for the injection molding step, so that generation of cracks in the injection molding step can be inhibited. The integral light quantity of the active energy ray is, for example, 1 mJ/cm 2 or more and less than 200 mJ/cm 2. After the semi-curing step, a trimming step of removing unnecessary parts of the laminated film may be performed.

The type of the active energy ray is not particularly limited. The active energy ray is appropriately selected according to the type of the resin component contained in the layer-forming composition. The active energy ray is not particularly limited, and may be an ionizing radiation such as ultraviolet ray, electron beam, α ray, β ray, and γ ray. Among them, ultraviolet rays having a wavelength of 380 nm or less are preferable. Ultraviolet ray is irradiated using, for example, a high-pressure mercury lamp or an ultra-high-pressure mercury lamp.

(2-4) Injection Molding Step (S24)

In injection molding, for example, the optical interference layer is made to face a mold and a resin for molding is injected against the transparent support substrate. Accordingly the laminated film is formed into the shape of the mold, and a formed resin layer is formed on the other main surface of the transparent support substrate.

(2-5) Curing Step (S23), Main Curing Step (S23-2)

The laminated film is irradiated with an active energy ray and the laminated film is thereby completely cured. Accordingly, a formed article is obtained. The integral light quantity of the active energy ray in the main curing step is 200 mJ/cm 2 or more. The integral light quantity of the active energy ray may be 5000 mJ/cm 2 or less, and may be 3000 mJ/cm 2 or less. The active energy ray may be of the same type as or different from that of the semi-curing step.

The embodiments described above are examples, and known treatments, processing steps, etc. may be introduced as desired.

EXAMPLES

The present invention will be described hereafter in more detail by way of examples, to which the present invention is not intended to be limited. In the examples, "parts" and "%" are on a mass basis unless otherwise indicated.

The ingredients used in the examples and the comparative examples are as follows.
(First and Second Polymers)
    Acrylic polymer A: Mw70,000
    Acrylic polymer B: Mw20,000
    Acrylic polymer C: Mw100,000
    The acrylic polymers A, B and C were prepared as follows.
[Preparation of Acrylic Polymer A]
    A mixture of 30.0 parts of 2,3-epoxypropyl methacrylate, 70 parts of methyl methacrylate, and 1.5 parts of t-butyl peroxy-2-ethylhexanoate was prepared. Separately, 40.0 parts of toluene was added to a 500 ml reaction vessel equipped with a stirring blade, a nitrogen introduction tube, a cooling tube, and a dropping funnel, and heated to 110° C. While the inside of the reaction vessel was stirred, the mixture was added dropwise at a constant speed over 2 hours under a nitrogen atmosphere. After the completion of the dropwise addition, a reaction was performed for 1 hour under a temperature condition of 110° C. Then, a mixture of 1.0 part of t-butyl peroxy-2-ethylhexanoate and 25.0 parts of toluene was added dropwise to the reaction vessel over 1 hour. Then, the inside of the reaction vessel was heated to 145° C. and allowed to react for another 2 hours. Subsequently, the inside of the reaction vessel was cooled to 110° C. or lower, and 59.0 parts of toluene was further added, affording a precursor μl.

A reaction vessel of the same type as above was charged with 226.5 parts of the precursor μl, 15.66 parts of acrylic acid, 0.43 parts of hydroquinone monomethyl ether, and 56 parts of toluene, which were then heated to 90° C. with blowing air and stirring. Under a temperature condition of 90° C., a mixed solution of 3.0 parts of toluene and 0.81 parts of tetrabutylammonium bromide was added to the reaction vessel and reacted for 1 hour. Subsequently, the reaction liquid was heated to 105° C., and it was reacted under a temperature condition of 105° C. until the acid value of the solid in the reaction liquid became 8 or less. Thereafter, a mixture of 0.43 parts of hydroquinone monomethyl ether and 3.0 parts of toluene was added to the reaction solution, and the temperature was adjusted to 75° C. Subsequently, a mixture of 10.1 parts of KARENZ MOI (manufactured by Showa Denko K.K.), 5.0 parts of toluene, and 0.043 parts of dibutyltin dilaurate was added thereto, and the resulting mixture was reacted under a temperature condition of 70° C. for 2 hours. Thereafter, the mixture was cooled to 60° C. or lower, and a mixture of 2.0 parts of methanol and 10.0 parts of toluene was added thereto. Accordingly, an acrylic polymer A having a weight-average molecular weight of 70,000 was obtained.

The acid value was measured in accordance with JIS K 5601-2-1 as follows. The reaction solution was titrated with a 0.1 N potassium hydroxide (KOH) solution, and the acid value was calculated according to the following formula:

acid value={(amount [ml] of KOH solution added)×(molar concentration [mol/L] of KOH solution}/(mass [g] of solid). The same applies hereinafter.
[Preparation of Acrylic Polymer B]
    A mixture of 30.0 parts of 2,3-epoxypropyl methacrylate, 70 parts of methyl methacrylate, and 10.0 parts of t-butyl peroxy-2-ethylhexanoate was prepared. Separately, 40.0 parts of toluene was added to a 500 ml reaction vessel equipped with a stirring blade, a nitrogen introduction tube, a cooling tube, and a dropping funnel, and heated to 110° C. While the inside of the reaction vessel was stirred, the mixture was added dropwise at a constant speed over 2 hours under a nitrogen atmosphere. After the completion of the dropwise addition, a reaction was performed for 1 hour under a temperature condition of 110° C. Then, a mixture of 1.0 part of t-butyl peroxy-2-ethylhexanoate and 25.0 parts of toluene was added dropwise to the reaction vessel over 1 hour. Then, the inside of the reaction vessel was heated to 145° C. and allowed to react for another 2 hours. Subsequently, the inside of the reaction vessel was cooled to 110° C. or lower, and 59.0 parts of toluene was further added, affording a precursor B1.

A reaction vessel of the same type as above was charged with 306.5 parts of the precursor B1, 15.66 parts of acrylic acid, 0.43 parts of hydroquinone monomethyl ether, and 56 parts of toluene, which were then heated to 90° C. with blowing air and stirring. Under a temperature condition of 90° C., a mixed solution of 3.0 parts of toluene and 0.81 parts of tetrabutylammonium bromide was added to the reaction vessel and reacted for 1 hour. Subsequently, the reaction liquid was heated to 105° C., and it was reacted under a temperature condition of 105° C. until the acid value of the solid in the reaction liquid became 8 or less. Thereafter, a mixed solution of 0.43 parts of hydroquinone monomethyl ether and 3.0 parts of toluene was added to the reaction solution, and the temperature was adjusted to 75° C. Subsequently, a mixture of 10.1 parts of KARENZ MOI (manufactured by Showa Denko K.K.), 5.0 parts of toluene, and 0.043 parts of dibutyltin dilaurate was added thereto, and the resulting mixture was reacted under a temperature condition of 70° C. for 2 hours. Thereafter, the mixture was cooled to 60° C. or lower, and a mixed solution of 2.0 parts of methanol and 10.0 parts of toluene was added thereto. Accordingly, an acrylic polymer B having a weight-average molecular weight of 20,000 was obtained.
[Preparation of Acrylic Polymer C]
    A mixture of 30.0 parts of 2,3-epoxypropyl methacrylate, 70 parts of methyl methacrylate, and 0.8 parts of t-butyl peroxy-2-ethylhexanoate was prepared. Separately, 40.0 parts of toluene was added to a 500 ml reaction vessel equipped with a stirring blade, a nitrogen introduction tube, a cooling tube, and a dropping funnel, and heated to 110° C. While the inside of the reaction vessel was stirred, the mixture was added dropwise at a constant speed over 2 hours under a nitrogen atmosphere. After the completion of the dropwise addition, a reaction was performed for 1 hour under a temperature condition of 110° C. Then, a mixture of 1.0 part of t-butyl peroxy-2-ethylhexanoate and 25.0 parts of toluene was added dropwise over 1 hour. Then, the inside of the reaction vessel was heated to 145° C. and allowed to react for another 2 hours. Subsequently, the inside of the reaction vessel was cooled to 110° C. or lower, and 59.0 parts of toluene was further added, affording a precursor C1.

A reaction vessel of the same type as above was charged with 295.8 parts of the precursor C1, 15.66 parts of acrylic acid, 0.43 parts of hydroquinone monomethyl ether, and 56 parts of toluene, which were then heated to 90° C. with blowing air and stirring. Under a temperature condition of 90° C., a mixture of 3.0 parts of toluene and 0.81 parts of tetrabutylammonium bromide was added to the reaction vessel and reacted for 1 hour. Subsequently, the reaction liquid was heated to 105° C., and it was reacted under a temperature condition of 105° C. until the acid value of the solid in the reaction liquid became 8 or less. Thereafter, a mixture of 0.43 parts of hydroquinone monomethyl ether and 3.0 parts of toluene was added, and the temperature was adjusted to 75° C. Subsequently, a mixture of 10.1 parts of KARENZ MOI (manufactured by Showa Denko K.K.), 5.0 parts of toluene, and 0.043 parts of dibutyltin dilaurate was added thereto, and the resulting mixture was reacted under a temperature condition of 70° C. for 2 hours. Thereafter, the mixture was cooled to 60° C. or lower, and a mixed solution of 2.0 parts of methanol and 10.0 parts of toluene was added thereto. Accordingly, an acrylic polymer C having a weight-average molecular weight of 100,000 was obtained.

(First and Second Oligomers (Polyfunctional Urethane Acrylate Oligomers))

KRM-8452: manufactured by Daicel-Allnex Ltd., Mw: 3,884, acryl equivalent: 120 g/eq CN-9893: manufactured by Arkema S.A.

H-7M40: manufactured by Negami Chemical Industrial Co., Ltd., Mw: 10,000 to 15,000

UN-904M: manufactured by Negami Chemical Industrial Co., Ltd., Mw: 4,900

(Polyfunctional Acrylate Oligomer)

ARONIX M-315: manufactured by Toagosei Co., Ltd., Mw: 450, acryl equivalent: 150 g/eq (First and Second Monomers (Polyfunctional Acrylate Monomers))

ARONIX M-402: manufactured by Toagosei Co., Ltd., DPHA

ARONIX M-305: manufactured by Toagosei Co., Ltd., PETA (Low-Refractive Particles)

THRULYA 4320: manufactured by JGC Catalysts and Chemicals Ltd., hollow silica fine particles, volume average particle size: 55 nm THRULYA 5320: manufactured by JGC Catalysts and Chemicals Ltd., hollow silica fine particles, volume average particle size: 75 nm (Inorganic Oxide Fine Particles)

OSCAL 1842: manufactured by JGC Catalysts and Chemicals Ltd., reactive silica organosol, particle size: 10 nm (High-Refractive Particles)

NANONS ZR-010: manufactured by Solar Co., Ltd., zirconium oxide, volume average particle size: 20 nm (Surface Conditioning Agent)

OPTOOL: DAC-HP, manufactured by Daikin Industries, Ltd.

(Surface Modifier)

MEGAFAC RS-57: manufactured by DIC Corporation (Photoinitiator)

Omnirad 127: manufactured by IGM RESINS, α-hydroxyacetophenone

Omnirad 184: manufactured by IGM RESINS, α-hydroxyalkylphenone (Transparent Support Substrate)

TB1-TB5: product name: AW-10U, manufactured by Wavelock Advanced Technology Co., Ltd., two-layer (PMMA/PC) film made of PMMA and PC, thickness: 300 μm (TB1), 200 μm (TB2), 500 μm (TB3), 30 μm (TB4), 100 μm (TB5)

(Protective Film)

TORAYFAN #40-2500, manufactured by Toray Industries, Inc., biaxially oriented polypropylene film (OPP), thickness: 40 μm

[Preparation of Composition LR1]

3.1 parts of acrylic polymer B (first polymer), 27.7 parts of ARONIX M-402 (first monomer), 11.6 parts of OPTOOL DAC-HP (surface conditioning agent), 8.0 parts of MEGA-FAC RS-57 (surface modifier), and 3.5 parts of Omnirad 127 (photoinitiator) were mixed. Furthermore, 46.1 parts of THRULYA 4320 (low-refractive particles) was blended. This mixture was diluted with propylene glycol monomethyl ether to prepare a milky white composition LR1 having a solid concentration of 3%. The refractive index of the layer formed of the resin composition LR1 was not less than 1.20 and not more than 1.55.

[Preparation of Compositions LR2 to LR15]

Milky white compositions LR2 to LR11, LR13 to LR15 and transparent composition LR12 each having a solid concentration of 3% were prepared in the same manner as for the composition LR1 except for using the formulations shown in Table 1A. All the refractive indexes of the layers formed of the resin compositions LR2 to LR15 were not less than 1.20 and not more than 1.55.

[Preparation of Composition HR1 for Forming a Functional Layer]

Milky white composition HR1 for forming a functional layer having a solid concentration of 3% was prepared in the same manner as for the composition LR1 except for using the formulation shown in Table 1B. The refractive index of the layer formed of the composition HR1 was more than 1.55 and not more than 2.00.

[Preparation of Composition HC1]

32.0 parts by mass of acrylic polymer A (second polymer), 36.3 parts by mass of KRM-8452 (second oligomer, polyfunctional urethane acrylate oligomer), 21.3 parts of ARONIX M-402 (second monomer), 4.1 parts by mass of OSCAL 1842 (inorganic oxide fine particles), and 6.3 parts by mass of Omnirad 184 (photopolymerization initiation) were mixed. This mixture was diluted with methyl isobutyl ketone to prepare a transparent composition HC1 having a solid concentration of 35%.

[Preparation of Compositions HC2 to HC5]

Transparent compositions HC2 to HC5 each having a solid concentration of 35% were prepared in the same manner as for the composition HC1 except for using the formulations shown in Table 1C.

Example 1

(1) Manufacture of Laminated Film (1-1) Formation of Uncured Optical Interference Layer The composition LR1 was applied to an OPP film (protective film) with a gravure coater such that the thickness after drying was 120 nm. Then, the resultant was dried at 80° C. for 1 minute to volatilize the solvent, thereby forming an uncured optical interference layer. The protective film on which the uncured optical interference layer was formed was wound into a roll form.

Hereinafter, optical interference layers formed of the compositions LR1 to LR15 each may be referred to as an "LR layer".

(1-2) Formation of Uncured Hard Coat Layer

The composition HC1 was applied to the PMMA surface of the transparent support substrate TB1 with a gravure coater such that the thickness after drying was 12 μm. Then, the resultant was dried at 80° C. for 1 minute to volatilize the solvent, thereby forming an uncured hard coat layer.

Hereinafter, each of the hard coat layers formed of the compositions HC1 to HC5 may be referred to as an "HC layer".

(1-3) Lamination of Uncured HC Layer and LR Layer

While the protective film wound in a roll form was unwound, the surface of the uncured HC layer supported by the transparent support substrate TB1 and the uncured LR layer surface supported by the protective film were bonded to each other. Accordingly, a laminated film including the transparent support substrate, the uncured HC layer, the uncured LR layer, and the protective film in this order was manufactured. Finally, the laminated film was wound into a roll with the protective film being inward.

(2) Manufacture of Formed Article (2-1) Formation of Decorative Layer

First, the laminated film was unwound from the roll and cut into a desired shape and a desired size. A print layer was formed by screen printing on a surface of the transparent support substrate of the laminated film on the side opposite from the uncured HC layer, and dried at a drying temperature of 80° C. for 10 minutes. This decoration step was repeated 5 times, and then the resultant was dried at 90° C. for 1 hour. For the formation of the print layer, a black coating material (RIM Ink Extra Black, manufactured by Jujo Chemical Co., Ltd.) was used.

(2-2) Peeling of Protective Film

The protective film was then peeled off from the uncured LR layer at a rate of 5.0 mm/sec.

(2-3) Preforming

The laminated film with the print layer was heated at 190° C. for 30 seconds, and then subjected to preforming by a vacuum pressure molding method using a three-dimensional mold having a maximum depth of 6 mm.

(2-4) Curing

The preformed laminated film was irradiated with an active energy ray having an integral light quantity of 2000 mJ/cm 2. Subsequently, trimming was performed.

(2-5) Injection Molding

Finally, injection molding was performed, so that a formed article having a formed resin layer (polycarbonate) on the print layer side of the transparent support substrate. In the examples, unless otherwise specified, ultraviolet rays are used as active energy rays.

[Evaluation]

The laminated film and the formed article were evaluated as follows. The results are shown in Table 2A.

(a) Thickness

An evaluation sample of 10 mm×10 mm was cut out from a laminated film. A cross section of the evaluation sample was exposed with a microtome (LEICA RM2265). The exposed cross section was observed with a laser microscope (VK8700, manufactured by KEYENCE Corporation) or a transmission electron microscope (JEM2100, manufactured by JEOL Ltd.), and the thickness of each 10 points of the HC layer, and the LR layer was measured. The average values were taken as the thickness of the HC layer and the thickness of the LR layer, respectively.

(b) Reflectance

A black coating material (product name: CZ-805 BLACK (manufactured by NIKKO BICS Co., Ltd.) was applied to a surface of the transparent support substrate of the laminated film opposite from the uncured HC layer with a bar coater such that a dry film thickness was 3 μm or more and 6 μm or less. Subsequently, the laminated film coated with the black coating material was allowed to stand in a room temperature environment for 5 hours and dried to prepare an uncured evaluation sample.

At arbitrary ten points, a reflectance by the SCI method was measured from the optical interference layer side of the evaluation sample. For the measurement, SD7000 manufactured by Nippon Denshoku Industries Co., Ltd. was used. The measurement was performed at wavelength intervals of 10 nm within a wavelength region between 380 nm and 780 nm, inclusive. The minimum value of the reflectance was determined at each measurement point, and the maximum value among the minimum values at 10 points was defined as the minimum value $R_{BH}$ of the reflectance.

The evaluation sample was subjected to a specific heating treatment, and the minimum value RA H of the reflectance was determined in the same manner as described above.

(c) Stretch Ratio

A test piece having a length of 200 mm×a width of 10 mm was cut out from a laminated film. The test piece was set in a tensile tester having a distance between chucks of 150 mm, and the long side of the evaluation sample was stretched by 10% in the long side direction under the conditions of a tensile force of 5.0 Kgf and a tensile speed of 300 mm/min in a 160° C. atmosphere. The presence or absence of cracks in the stretched evaluation sample was visually checked.

When no crack occurred, a new evaluation sample was cut out, and then the long side was stretched by 20% in the long side direction. Then, similarly, the presence or absence of cracks was visually checked. This procedure was repeated while increasing the stretch ratio by 10%. The stretch ratio applied when a crack was first observed was taken as the stretch ratio of the laminated film. The evaluation was performed three times for the evaluation samples cut out from the same laminated film, and the average value of the stretch ratios obtained in each time was taken as the stretch ratio $E_{160}$ of the laminated film.

(d) Coating Film Hardness

The hardness $H_{BC}$ and the hardness $H_{AC}$ were measured from the uncured LR layer side of the laminated film and the LR layer side of the formed article, respectively.

The hardness was measured by continuous stiffness measurement (method used: Advanced Dynamic E and H. NMT) using iMicro Nanoindenter manufactured by NANOMECHANICS, INC.

Specifically, a minute AC load was superimposed on a quasi-static test load on the surface of the evaluation sample. The load was applied until it reached a maximum load of 50 mN. As an indenter, a verkovich type diamond indenter (tip curvature radius: 20 nm) was used. Continuous stiffness with respect to depth was calculated from the vibration component of the resulting displacement and the phase difference between the displacement and the load, and the profile of hardness with respect to depth was obtained. A hardness at a depth of 1000 nm of this profile was calculated.

iMicro-dedicated software was used to calculate the load and stiffness. In calculating the stiffness, the Poisson's ratio of the coating layer was set to 0.35. The load was controlled such that the strain rate $(\partial P/\partial t)/P$ was 0.2.

(e) Reflection of External Light

Light of a fluorescent lamp was reflected on the surface of a formed article on the optical interference layer side, and reflection of external light was visually evaluated.

The evaluation criteria are as follows.

Good: Reflection of external light is hardly recognized.

Fair: Reflection of external light is slightly recognized.

Poor: Reflection of external light is clearly recognized.

(f) Followability to Three-Dimensional Shape

Using two types of molds having maximum depths of 3 mm and 6 mm, respectively, the laminated film was preformed, and the followability to a three-dimensional shape was evaluated.

The evaluation criteria are as follows.

Good: Cracks and whitening are not visually recognized even when formed into a deep three-dimensional shape.

Fair: Cracks and whitening are visually recognized when formed into a deep three-dimensional shape, but cracks and whitening are not visually recognized when formed into a shallow three-dimensional shape.

Poor: Cracks or whitening is visually recognized even when formed into a shallow three-dimensional shape.

(g) Handleability after Preforming

The preformed laminated film was irradiated with an active energy ray having an integral light quantity of 2000 mJ/cm 2 to afford an evaluation sample. The handleability when setting the evaluation sample in a mold for injection molding was evaluated.

The evaluation criteria are as follows.

Good: The evaluation sample has stiffness, and can be easily placed in an injection molding mold.

Fair: The stiffness of the evaluation sample is weak, and there is some difficulty in handling, but it can be placed in a mold.

Poor: The stiffness of the evaluation sample is weak, and the evaluation sample cannot be placed in a mold.

(h) Warpage of Formed Article

An evaluation sample of 200 mm×200 mm was cut out from the laminated film and irradiated with an active energy ray having an integral light quantity of 2000 mJ/cm$^2$. Subsequently, the evaluation sample was placed on a horizontal plane, and the amount of lifting (amount of warpage) of the four corners from the horizontal plane was measured using a ruler and averaged.

The evaluation criteria are as follows.

Excellent: The average amount of warpage is 10 mm or less.

Good: The average amount of warpage is 10 or more and less than 15 mm.

Fair: The average amount of warpage is 15 mm or more and less than 20 mm.

Poor: The average amount of warpage is 20 mm or more.

(i) Appearance after Decoration Step

The laminated film after peeling off the protective film (2-2) and before the preforming (2-3) was used as an evaluation sample. The presence of squeegee marks and suction marks due to the decoration step of the evaluation sample was visually checked.

Evaluation criteria are as follows.

Excellent: There are no squeegee marks and no suction marks.

Good: There are slight squeegee marks and suction marks, but they are leveled and disappeared by heating to 90° C. or more.

Fair: There are slight squeegee marks and suction marks, but they are leveled and disappeared by heating to 150° C. or more.

Poor: There are squeegee marks and suction marks.

(j) Bonding Property Between Uncured HC Layer and LR Layer

The laminate of a protective film and an uncured optical interference layer prepared in (1-1) and the laminate of a transparent support substrate and an uncured hard coat layer prepared in (1-2) were bonded to each other while being pressed with a hand roller such that the layers faced each other, and the degree of bonding was evaluated.

Evaluation criteria are as follows.

Good: The laminates are bonded to each other.

Fair: The laminates are bonded to each other, but adhesion is weak.

(k) Pencil Hardness

The pencil hardness of the LR layer of the formed article was evaluated.

Pencil hardness was measured according to JIS K5600-5-4 (1999), Scratch Hardness (the pencil method).

(l) Abrasion Resistance

The surface of the LR layer of the formed article was rubbed 3,000 times with a friction block to which a cotton cloth was fixed while applying a vertical load of 19.6 N per 4 cm 2 of the laminated film surface. The surface of the LR layer of the formed article was visually observed. The evaluation criteria are as follows.

Excellent: No scratches were visually recognized even after 3,000 rubs.

Good: No scratches were visually recognized after 1,000 rubs, but scratches were visually recognized after 3,000 rubs.

Fair: After 1,000 rubs, 5 or less scratches were visually recognized.

Poor: After 1,000 rubs, many scratches were visually recognized.

(m) Chemical Resistance

An evaluation sample of 10 cm×10 cm was cut out from a formed article. Throughout the surface of the LR layer of the evaluation sample was applied 2 g of Neutrogena SUNSCREEN SPF 45 (manufactured by Johnson & Johnson) uniformly with a finger. Subsequently, the sample was warmed at 80° C. for 4 hours. Then, the sample was cooled to room temperature, washed with water, and the appearance of the LR layer was visually evaluated.

The evaluation criteria are as follows.

Excellent: No appearance abnormality was observed.

Good: Applied marks are recognized, but lifting is not recognized.

Poor: Lifting occurred.

Examples 2 to 10, 12 to 22, Comparative Examples 3 to 10

In the same manner as in Example 1, laminated films and formed articles having the configurations shown in Table 2A through Table 2C were prepared using the compositions prepared with the formulations shown in Table 1A and Table 1C. The laminated films and the formed articles obtained were evaluated in the same manner as in Example 1. The results are shown in Tables 2A to 2C.

Example 11

An uncured hard coat layer and an uncured optical interference layer were formed in the same manner as in (1-1) and (1-2) of Example 1, respectively.

Separately, a protective film in which an uncured functional layer (HR layer) having the composition shown in Table 1B was formed was obtained in the same manner as in the step (1-1) of forming an uncured optical interference layer. The protective film on which the uncured HR layer was formed was wound into a roll form. While the protective film was unwound, the uncured HR layer surface supported by the protective film and the uncured HC layer surface supported by the transparent support substrate were bonded to each other.

Next, the protective film was peeled off to expose the uncured HR layer. The uncured LR layer prepared in (1-1) was bonded to the HR layer while being unwound. Accordingly, a laminated film and a formed article each including an uncured HC layer, an uncured HR layer, and an uncured LR layer in this order were prepared. The laminated films and the formed articles obtained were evaluated in the same manner as in Example 1. The results are shown in Tables 2A and 2B.

Comparative Example 1

An uncured HC layer was formed on the transparent support substrate TB1 in the same manner as in Example 1 except that the composition HC4 was used. Next, the HC layer was irradiated with an active energy ray with an integral light quantity of 2000 mJ/cm 2 and the HC layer was thereby cured.

The composition LR11 was applied to the cured HC layer. Subsequently, the composition LR11 was dried to form an LR layer having a dry thickness of 120 nm. Finally, an active energy ray having an integral light quantity of 2000 mJ/cm 2 was applied to afford a precure type laminated film. Using this laminated film, a formed article was prepared and evaluated in the same manner as in Example 1. The results are shown in Table 2C.

Comparative Example 2

A precure type laminated film was obtained in the same manner as in Comparative Example 1 except that the composition LR1 was used instead of the composition LR11 and the composition HC5 was used instead of the composition HC4. Using this laminated film, a formed article was prepared and evaluated in the same manner as in Example 1. The results are shown in Table 2C.

TABLE 1A

| | Type | Product name | LR1 | LR2 | LR3 | LR4 | LR5 | LR6 | LR7 | LR8 |
|---|---|---|---|---|---|---|---|---|---|---|---|
| LR layer | Acrylic polymer A | | | | | | | | 15.4 | |
| | Acrylic polymer B | | 3.1 | | | 7.7 | 3.1 | 12.3 | | |
| | Acrylic polymer C | | | | | | | | | 3.1 |
| | Polyfunctional urethane acrylate oligomer | KRM-8452 | | | | | | | | |
| | Polyfunctional urethane acrylate oligomer | CN-9893 | | | | | | | | |
| | Polyfunctional acrylate oligomer | ARONIX M-315 | | | | | | | | |
| | Polyfunctional acrylate monomer | ARONIX M-402 | 27.7 | | 30.8 | 23.1 | 12.3 | 3.1 | | 27.7 |
| | Polyfunctional acrylate monomer | ARONIX M-305 | | 53.8 | | | | | | |
| | Hollow silica fine particles (55 nm) | THRULYA 4320 | 46.1 | | 46.1 | 46.1 | 61.5 | 61.5 | 61.5 | 46.1 |
| | Hollow silica fine particles (75 nm) | THRULYA 5320 | | 23.1 | | | | | | |
| | Surface conditioning agent | OPTOOL DAC-HP | 11.6 | 11.6 | 11.6 | 11.6 | 11.6 | 11.6 | 11.6 | 11.6 |
| | Surface modifier | MEGAFAC RS-57 | 8.0 | 8.0 | 8.0 | 8.0 | 8.0 | 8.0 | 8.0 | 8.0 |
| | Photoinitiator | Omnirad 127 | 3.5 | 3.5 | 3.5 | 3.5 | 3.5 | 3.5 | 3.5 | 3.5 |
| | | Total | 100.0 | 100.0 | 100.0 | 100.0 | 100.0 | 100.0 | 100.0 | 100.0 |
| | | 1/2X-15 | 15.0 | 0.0 | 15.0 | 15.0 | 25.0 | 25.0 | 25.0 | 15.0 |
| | | Z | 4.0 | 0.0 | 0.0 | 10.0 | 4.0 | 16.0 | 20.0 | 4.0 |

| | Type | Product name | LR9 | LR10 | LR11 | LR12 | LR13 | LR14 | LR15 |
|---|---|---|---|---|---|---|---|---|---|
| LR layer | Acrylic polymer A | | | 3.1 | | | 40.0 | | |
| | Acrylic polymer B | | | | 3.1 | | | 7.7 | 15.4 |
| | Acrylic polymer C | | | | | | | | |
| | Polyfunctional urethane acrylate oligomer | KRM-8452 | | | 27.7 | | 55.2 | | |
| | Polyfunctional urethane acrylate oligomer | CN-9893 | | | | 36.7 | | | |
| | Polyfunctional acrylate oligomer | ARONIX M-315 | | | | 12.2 | | | |
| | Polyfunctional acrylate monomer | ARONIX M-402 | 27.7 | | | | 61.5 | | 15.4 |
| | Polyfunctional acrylate monomer | ARONIX M-305 | | | | | | 38.4 | |
| | Hollow silica fine particles (55 nm) | THRULYA 4320 | 46.1 | 46.1 | 44.8 | | 15.4 | 30.8 | 46.1 |
| | Hollow silica fine particles (75 nm) | THRULYA 5320 | | | | | | | |
| | Surface conditioning agent | OPTOOL DAC-HP | 11.6 | 11.6 | 2.9 | | 11.6 | 11.6 | 11.6 |
| | Surface modifier | MEGAFAC RS-57 | 8.0 | 8.0 | | | 8.0 | 8.0 | 8.0 |
| | Photoinitiator | Omnirad 127 | 3.5 | 3.5 | 3.4 | 4.8 | 3.5 | 3.5 | 3.5 |
| | | Total | 100.0 | 100.0 | 100.0 | 100.0 | 100.0 | 100.0 | 100.0 |
| | | 1/2X-15 | 15.0 | 15.0 | 8.9 | −15.0 | −5.0 | 5.0 | 15.0 |
| | | Z | 4.0 | 4.0 | 0.0 | 42.0 | 0.0 | 10.0 | 20.0 |

TABLE 1B

| | Type | Product name | HR1 |
|---|---|---|---|
| HR layer | Acrylic polymer A | | 10.9 |
| | Polyfunctional urethane acrylate oligomer | KRM-8452 | 3.0 |
| | Polyfunctional acrylate monomer | ARONIX M-402 | 10.8 |

TABLE 1B-continued

| Type | Product name | HR1 |
|---|---|---|
| High-refractive particle | NANON5 ZR-010 | 71.6 |
| Photoinitiator | Omnirad 127 | 3.7 |
| Total | | 100.0 |

TABLE 1C

| | Type | Product name | HC1 | HC2 | HC3 | HC4 | HC5 |
|---|---|---|---|---|---|---|---|
| HC layer | Acrylic polymer A | | 32.0 | | | | |
| | Acrylic polymer B | | | 53.8 | 35.8 | | |
| | Polyfunctional urethane acrylate oligomer | KRM-8452 | 36.3 | | | | |
| | Polyfunctional urethane acrylate oligomer | CN-9893 | | | | 71.4 | |
| | Polyfunctional urethane acrylate oligomer | UN-904M | | | | | 47.6 |
| | Polyfunctional urethane acrylate oligomer | H-7M40 | | | | | 47.6 |
| | Polyfunctional acrylate oligomer | ARONIX M-315 | | | | 23.8 | |
| | Polyfunctional acrylate monomer | ARONIX M-402 | 21.3 | 35.8 | 53.8 | | |
| | Inorganic oxide fine particle | OSCAL-1842 | 4.1 | 4.1 | 4.1 | | |
| | Photoinitiator | Omnirad 184 | 6.3 | 6.3 | 6.3 | 4.8 | 4.8 |
| | Total | | 100.0 | 100.0 | 100.0 | 100.0 | 100.0 |

TABLE 2A

| | | Example | 1 | 2 | 3 | 4 | 5 | 6 |
|---|---|---|---|---|---|---|---|---|
| Constitution | Cured state | | | | | | | |
| | LR layer | Composition | Uncured LR1 | Uncured LR2 | Uncured LR3 | Uncured LR4 | Uncured LR5 | Uncured LR6 |
| | | Thickness (nm) | 120 | 120 | 120 | 120 | 120 | 120 |
| | HR layer | Composition | — | — | — | — | — | — |
| | | Thickness | — | — | — | — | — | — |
| | HC layer | Composition | HC1 | HC1 | HC1 | HC1 | HC1 | HC1 |
| | | Thickness (μm) | 12 | 12 | 12 | 12 | 12 | 12 |
| | Transparent support substrate | Type | TB1 | TB1 | TB1 | TB1 | TB1 | TB1 |
| | | Thickness (μm) | 300 | 300 | 300 | 300 | 300 | 300 |
| (b) Reflectance (%) | | $R_{BH}$ | 1.6 | 1.9 | 1.6 | 1.9 | 1.5 | 1.5 |
| | | $R_{AH}$ | 1.6 | 2 | 1.6 | 1.7 | 1.5 | 1.6 |
| | | Rate of change | 0.0% | 5.3% | 0.0% | −10.5% | 0.0% | 6.7% |
| (c) Stretch ratio (%) | | $E_{160}$ | ≥50 | ≥50 | ≥50 | ≥50 | ≥50 | ≥50 |
| (d) Hardness (GPa) | | $H_{BC}$ | 0.21 | 0.21 | 0.21 | 0.21 | 0.21 | 0.21 |
| | | $H_{AC}$ | 0.35 | 0.36 | 0.35 | 0.35 | 0.34 | 0.34 |
| (e) Reflection of external light | | | Good | Fair | Good | Fair | Good | Good |
| (f) Followability to three-dimensional shape | | | Good | Good | Good | Good | Good | Good |
| (g) Handleability after preforming | | | Good | Good | Good | Good | Good | Good |
| (h) Warpage of formed article | | | Excellent | Excellent | Excellent | Excellent | Excellent | Excellent |
| (i) Appearance after decoration step | | | Excellent | Excellent | Excellent | Excellent | Excellent | Excellent |
| (j) Bonding property | | | Good | Good | Good | Good | Good | Good |
| (k) Pencil hardness | | | 2H | 2H | 2H | 2H | 2H | 2H |
| (l) Abrasion resistance | | | Excellent | Excellent | Excellent | Excellent | Good | Good |
| (m) Chemical resistance | | | Excellent | Excellent | Excellent | Excellent | Excellent | Excellent |

| | | Example | 7 | 8 | 9 | 10 | 11 |
|---|---|---|---|---|---|---|---|
| Constitution | Cured state | | | | | | |
| | LR layer | Composition | Uncured LR7 | Uncured LR8 | Uncured LR9 | Uncured LR10 | Uncured LR1 |
| | | Thickness (nm) | 120 | 120 | 120 | 120 | 120 |
| | HR layer | Composition | — | — | — | — | HR1 |
| | | Thickness | — | — | — | — | 80 |
| | HC layer | Composition | HC1 | HC1 | HC1 | HC1 | HC1 |
| | | Thickness (μm) | 12 | 12 | 12 | 12 | 12 |
| | Transparent support substrate | Type | TB1 | TB1 | TB1 | TB1 | TB1 |
| | | Thickness (μm) | 300 | 300 | 300 | 300 | 300 |
| (b) Reflectance (%) | | $R_{BH}$ | 1.5 | 1.6 | 1.6 | 1.8 | 1 |
| | | $R_{AH}$ | 1.8 | 1.6 | 1.6 | 1.7 | 1.1 |
| | | Rate of change | 20.0% | 0.0% | 0.0% | −5.6% | 10.0% |
| (c) Stretch ratio (%) | | $E_{160}$ | ≥50 | ≥50 | ≥50 | ≥50 | ≥50 |
| (d) Hardness (GPa) | | $H_{BC}$ | 0.21 | 0.21 | 0.21 | 0.21 | 0.21 |
| | | $H_{AC}$ | 0.34 | 0.35 | 0.35 | 0.35 | 0.36 |
| (e) Reflection of external light | | | Good | Good | Good | Good | Good |
| (f) Followability to three-dimensional shape | | | Good | Good | Good | Good | Good |
| (g) Handleability after preforming | | | Good | Good | Good | Good | Good |

TABLE 2A-continued

| | | | | | |
|---|---|---|---|---|---|
| (h) Warpage of formed article | Excellent | Excellent | Excellent | Excellent | Excellent |
| (i) Appearance after decoration step | Excellent | Excellent | Excellent | Excellent | Excellent |
| (j) Bonding property | Good | Good | Good | Good | Good |
| (k) Pencil hardness | H | 2H | 2H | 2H | 2H |
| (l) Abrasion resistance | Good | Excellent | Excellent | Excellent | Excellent |
| (m) Chemical resistance | Excellent | Excellent | Excellent | Excellent | Excellent |

TABLE 2B

| Example | | | | 12 | 13 | 14 | 15 | 16 | 17 |
|---|---|---|---|---|---|---|---|---|---|
| Constitution | Cured state | | | Uncured | Uncured | Uncured | Uncured | Uncured | Uncured |
| | LR layer | Composition | | LR1 | LR1 | LR1 | LR1 | LR1 | LR1 |
| | | Thickness (nm) | | 120 | 120 | 120 | 120 | 120 | 70 |
| | HR layer | Composition | | — | — | — | — | — | — |
| | | Thickness | | — | — | — | — | — | — |
| | HC layer | Composition | | HC2 | HC3 | HC1 | HC1 | HC1 | HC1 |
| | | Thickness (μm) | | 12 | 12 | 12 | 12 | 12 | 12 |
| | Transparent | Type | | TB1 | TB1 | TB2 | TB3 | TB5 | TB1 |
| | support substrate | Thickness (μm) | | 300 | 300 | 200 | 500 | 100 | 300 |
| | (b) Reflectance (%) | $R_{BH}$ | | 1.6 | 1.6 | 1.6 | 1.6 | 1.6 | 2 |
| | | $R_{AH}$ | | 1.6 | 1.6 | 1.6 | 1.6 | 1.6 | 2 |
| | | Rate of change | | 0.0% | 0.0% | 0.0% | 0.0% | 0.0% | 0.0% |
| | (c) Stretch ratio (%) | $E_{160}$ | | ≥50 | ≥50 | ≥50 | ≥50 | ≥50 | ≥50 |
| | (d) Hardness (GPa) | $H_{BC}$ | | 0.25 | 0.15 | 0.21 | 0.21 | 0.21 | 0.21 |
| | | $H_{AC}$ | | 0.32 | 0.38 | 0.35 | 0.35 | 0.35 | 0.35 |
| | (e) Reflection of external light | | | Good | Good | Good | Good | Good | Fair |
| | (f) Followability to three-dimensional shape | | | Good | Good | Good | Good | Good | Good |
| | (g) Handleability after preforming | | | Good | Good | Good | Good | Fair | Good |
| | (h) Warpage of formed article | | | Excellent | Excellent | Excellent | Excellent | Good | Excellent |
| | (i) Appearance after decoration step | | | Excellent | Fair | Excellent | Excellent | Good | Excellent |
| | (j) Bonding property | | | Fair | Good | Good | Good | Good | Good |
| | (k) Pencil hardness | | | H | 3H | 2H | 3H | H | 2H |
| | (l) Abrasion resistance | | | Good | Excellent | Excellent | Excellent | Excellent | Excellent |
| | (m) Chemical resistance | | | Excellent | Excellent | Excellent | Excellent | Excellent | Excellent |

| Example | | | 18 | 19 | 20 | 21 | 22 |
|---|---|---|---|---|---|---|---|
| Constitution | Cured state | | Uncured | Uncured | Uncured | Uncured | Uncured |
| | LR layer | Composition | LR1 | LR1 | LR1 | LR1 | LR1 |
| | | Thickness (nm) | 170 | 120 | 120 | 120 | 120 |
| | HR layer | Composition | — | — | — | — | — |
| | | Thickness | — | — | — | — | — |
| | HC layer | Composition | HC1 | HC1 | HC1 | HC1 | HC1 |
| | | Thickness (μm) | 12 | 3 | 23 | 1.5 | 35 |
| | Transparent | Type | TB1 | TB1 | TB1 | TB1 | TB1 |
| | support substrate | Thickness (μm) | 300 | 300 | 300 | 300 | 300 |
| | (b) Reflectance (%) | $R_{BH}$ | 2 | 1.6 | 1.6 | 1.6 | 1.6 |
| | | $R_{AH}$ | 2 | 1.6 | 1.6 | 1.6 | 1.6 |
| | | Rate of change | 0.0% | 0.0% | 0.0% | 0.0% | 0.0% |
| | (c) Stretch ratio (%) | $E_{160}$ | ≥50 | ≥50 | ≥50 | ≥50 | ≥50 |
| | (d) Hardness (GPa) | $H_{BC}$ | 0.21 | 0.23 | 0.21 | 0.25 | 0.21 |
| | | $H_{AC}$ | 0.35 | 0.34 | 0.35 | 0.33 | 0.35 |
| | (e) Reflection of external light | | Fair | Good | Good | Good | Good |
| | (f) Followability to three-dimensional shape | | Good | Good | Good | Good | Good |
| | (g) Handleability after preforming | | Good | Good | Good | Good | Good |
| | (h) Warpage of formed article | | Excellent | Excellent | Good | Excellent | Fair |
| | (i) Appearance after decoration step | | Excellent | Excellent | Excellent | Excellent | Excellent |
| | (j) Bonding property | | Good | Good | Good | Good | Good |
| | (k) Pencil hardness | | 2H | H | 3H | F | 3H |
| | (l) Abrasion resistance | | Excellent | Excellent | Excellent | Good | Excellent |
| | (m) Chemical resistance | | Excellent | Excellent | Excellent | Excellent | Excellent |

TABLE 2C

| Comparative Example | | | 1 | 2 | 3 | 4 | 5 |
|---|---|---|---|---|---|---|---|
| Constitution | Cured state | | Cured | Cured | Uncured | Uncured | Uncured |
| | LR layer | Composition | LR11 | LR1 | — | LR12 | LR13 |
| | | Thickness (nm) | 120 | 120 | — | 120 | 120 |

TABLE 2C-continued

| | | | | | | | |
|---|---|---|---|---|---|---|---|
| HR layer | Composition | — | — | — | — | — |
| | Thickness | — | — | — | — | — |
| HC layer | Composition | HC4 | HC5 | HC1 | HC1 | HC1 |
| | Thickness (μm) | 3 | 3 | 12 | 12 | 12 |
| Transparent support substrate | Type | TB1 | TB1 | TB1 | TB1 | TB1 |
| | Thickness (μm) | 300 | 300 | 300 | 300 | 300 |
| (b) Reflectance (%) | $R_{BH}$ | — | — | 4 | 4 | 2.2 |
| | $R_{AH}$ | 1.5 | 1.5 | 4 | 4 | 2.7 |
| | Rate of change | — | — | 0.0% | 0.0% | 22.7% |
| (c) Stretch ratio (%) | $E_{160}$ | 40 | <10 | ≥50 | ≥50 | ≥50 |
| (d) Hardness (GPa) | $H_{BC}$ | — | — | 0.18 | 0.18 | 0.21 |
| | $H_{AC}$ | 0.23 | 0.33 | 0.33 | 0.33 | 0.36 |
| (e) Reflection of external light | | Good | Good | Poor | Poor | Poor |
| (f) Followability to three-dimensional shape | | Fair | Poor | Good | Good | Good |
| (g) Handleability after preforming | | Good | Good | Good | Good | Good |
| (h) Warpage of formed article | | Excellent | Excellent | Excellent | Excellent | Excellent |
| (i) Appearance after decoration step | | Excellent | Excellent | Excellent | Excellent | Excellent |
| (j) Bonding property | | — | — | — | Good | Good |
| (k) Pencil hardness | | F | 2H | 2H | 2H | 2H |
| (l) Abrasion resistance | | Poor | Good | Fair | Good | Excellent |
| (m) Chemical resistance | | Poor | Excellent | Excellent | Excellent | Excellent |

| | | Comparative Example | 6 | 7 | 8 | 9 | 10 |
|---|---|---|---|---|---|---|---|
| Constitution | Cured state | | Uncured | Uncured | Uncured | Uncured | Uncured |
| | LR layer | Composition | LR14 | LR15 | LR1 | LR1 | LR1 |
| | | Thickness (nm) | 120 | 120 | 10 | 210 | 120 |
| | HR layer | Composition | — | — | — | — | — |
| | | Thickness | — | — | — | — | — |
| | HC layer | Composition | HC1 | HC1 | HC1 | HC1 | HC1 |
| | | Thickness (μm) | 12 | 12 | 12 | 12 | 12 |
| | Transparent support substrate | Type | TB1 | TB1 | TB1 | TB1 | TB4 |
| | | Thickness (μm) | 300 | 300 | 300 | 300 | 30 |
| (b) Reflectance (%) | | $R_{BH}$ | 1.8 | 2 | 4 | 3 | 1.6 |
| | | $R_{AH}$ | 2.8 | 3.3 | 4 | 3 | 1.6 |
| | | Rate of change | 55.6% | 65.0% | 0.0% | 0.0% | 0.0% |
| (c) Stretch ratio (%) | | $E_{160}$ | ≥50 | ≥50 | ≥50 | ≥50 | ≥50 |
| (d) Hardness (GPa) | | $H_{BC}$ | 0.21 | 0.21 | 0.21 | 0.21 | 0.21 |
| | | $H_{AC}$ | 0.35 | 0.34 | 0.33 | 0.35 | 0.33 |
| (e) Reflection of external light | | | Poor | Poor | Poor | Poor | — |
| (f) Followability to three-dimensional shape | | | Good | Good | Good | Good | Good |
| (g) Handleability after preforming | | | Good | Good | Good | Good | Poor |
| (h) Warpage of formed article | | | Excellent | Excellent | Excellent | Excellent | Poor |
| (i) Appearance after decoration step | | | Excellent | Excellent | Excellent | Excellent | Poor |
| (j) Bonding property | | | Good | Good | Good | Good | Good |
| (k) Pencil hardness | | | 2H | 2H | 2H | 2H | — |
| (l) Abrasion resistance | | | Excellent | Good | Poor | Excellent | — |
| (m) Chemical resistance | | | Excellent | Excellent | Excellent | Excellent | — |

As can be seen from Tables 2A and 2B, the laminated films according to the present embodiment have a low reflectance even after heating treatment. Although the laminated film has a high stretch ratio (50% or more, specifically 70% or more), a formed article obtained from the laminated film has superior hard coat performance (for example, high hardness, abrasion resistance, chemical resistance, etc.) and superior antireflection property. Furthermore, the laminated film according to the present embodiment was superior in followability to a mold having a deep three-dimensional shape in the preforming step.

The laminated films of Comparative Examples 1 and 2 are of a precure type. In Comparative Example 1, each layer is formed of a composition that enables a certain degree of three-dimensional formation after curing. Therefore, the crosslinking density of the composition after curing is low, and the abrasion resistance and the chemical resistance are poor. On the other hand, in Comparative Example 2, each layer is formed of a composition which will afford a cured composition high in crosslinking density and superior in abrasion resistance and chemical resistance. Thus, the laminated film of Comparative Example 2 was poor in three-dimensional formability after curing, and could not follow even a mold having a shallow three-dimensional shape in the preforming step.

Since the laminated film of Comparative Example 3 has no optical interference layer, the minimum value of the reflectance exceeds 2%. With the laminated films of Comparative Examples 4, 5, 8, and 9, the minimum value of the reflectance exceeds 2% before and after the specific heating treatment. Furthermore, in Comparative Examples 6 and 7, the reflectance is increased by the specific heating treatment. In particular, the minimum value of the reflectance of the laminated film of Comparative Example 6 is small before the specific heating treatment, but is far greater than 2% after the specific heating treatment. In Comparative Example 10, since the transparent support substrate was excessively thin, the rigidity of the substrate was low, so that it was impossible to obtain a formed article.

INDUSTRIAL APPLICABILITY

According to the present invention, it is possible to provide a laminated film that can be formed into a complicated three-dimensional shape. Thus, this laminated film is preferably used particularly for manufacturing a protective material for a display.

This application claims priority based on Japanese Patent Application No. 2020-202122, which was filed in Japan on Dec. 4, 2020, the disclosure of which application is incorporated herein by reference in its entirety.

REFERENCE SIGNS LIST

10 Laminated film
11 Transparent support substrate
12 Uncured hard coat layer
13 Uncured optical interference layer
14 Another support substrate
20 Formed article
22 Cured hard coat layer
23 Cured optical interference layer
24 Decorative layer
25 Formed resin layer
30 Roller

The invention claimed is:

1. A laminated film comprising:

a transparent support substrate, an uncured hard coat layer formed on at least one surface of the transparent support substrate, and an uncured optical interference layer formed on the uncured hard coat layer, wherein the uncured hard coat layer comprises an active energy ray-curable composition for forming a hard coat layer, the uncured optical interference layer comprises an active energy ray-curable composition for forming an optical interference layer, the transparent support substrate has a thickness of 50 μm or more and 600 μm or less, a stretch ratio of the laminated film at 160° C. is 50% or more, the laminated film heat-treated at a temperature of 90° C. for 30 minutes has a minimum value $R_{AH}$ of a reflectance taken between wavelengths of 380 nm and 780 nm of 2% or less and measured from a side of the uncured optical interference layer, the composition for forming the optical interference layer comprises a first layer-forming component and low-refractive particles, the first layer-forming component comprises a first reactive component having two or more polymerizable functional groups in one molecule, the first reactive component comprises at least one selected from the group consisting of a first polymer having a weight-average molecular weight of more than 10,000, a first oligomer having a weight-average molecular weight of 10,000 or less, and a first monomer having a weight-average molecular weight of 10,000 or less, and a content X of the low-refractive particles, a total content Y of the first oligomer and the first monomer, and a content Z of the first polymer satisfy the following relationship:

$$X + Y + Z = 100,$$

$$X \geq 30,$$

$$Y \geq 0,$$

$$Z \geq 0, \text{ and}$$

$$Z \leq 1/2X - 15,$$

provided that Y and Z are not 0 at the same time.

2. The laminated film according to claim 1, wherein the minimum value $R_{AH}$ of the reflectance and a minimum value $R_{BH}$ of the reflectance of the laminated film before being heat-treated taken between the wavelengths of 380 nm and 780 nm and measured from the side of the uncured optical interference layer satisfy a relationship:

$$100 \times |R_{AH} - R_{BH}|/R_{BH} \leq 20(\%).$$

3. The laminated film according to claim 1, wherein the composition for forming a hard coat layer comprises a second layer-forming component, the second layer-forming component comprises a second reactive component having two or more polymerizable functional groups in one molecule, and the second reactive component comprises at least one of a second oligomer having a weight-average molecular weight of 10,000 or less and a second monomer having a weight-average molecular weight of 10,000 or less.

4. The laminated film according to claim 3, wherein the second reactive component further comprises a second polymer having a weight-average molecular weight of more than 10,000.

5. The laminated film according to claim 3, wherein a total content of the second oligomer and the second monomer is 25 parts by mass or more and 65 parts by mass or less based on 100 parts by mass of a solid content of the composition for forming the hard coat layer.

6. The laminated film according to claim 1, further comprising at least one uncured functional layer between the uncured hard coat layer and the uncured optical interference layer.

7. The laminated film according to claim 1, wherein a hardness $H_{BC}$ measured from an uncured optical interference layer side by a nanoindentation method is 0.1 GPa or more and 0.5 GPa or less.

8. The laminated film according to claim 1, wherein the laminated film irradiated with an active energy ray having an integral light quantity of 2000 mJ/cm² has a hardness $H_{AC}$ of 0.25 GPa or more and 0.7 GPa or less as measured from the side of the optical interference layer by a nanoindentation method.

9. The laminated film according to claim 1, wherein the uncured hard coat layer has a thickness of 2 μm or more and 30 μm or less.

10. The laminated film according to claim 1, wherein the uncured optical interference layer has a thickness of 15 nm or more and 200 nm or less.

11. A formed article comprising the laminated film according to claim 1 cured.

12. The formed article according to claim 11, wherein the hard coat layer is disposed on one main surface of the transparent support substrate, and the formed article further comprises a decorative layer disposed on the other main surface of the transparent support substrate.

13. The formed article according to claim 12, further comprising a formed resin layer that covers at least part of the decorative layer.

14. A method for manufacturing a laminated film, the method comprising:

a step of forming an uncured hard coat layer by applying an active energy ray-curable composition for forming a hard coat layer to one surface of a transparent support substrate having a thickness of 50 μm or more and 600 μm or less;

a step of forming an uncured optical interference layer by applying an active energy ray-curable composition for forming an optical interference layer to one surface of another support substrate; and a lamination step of bonding a surface of the uncured hard coat layer on a side opposite from the transparent support substrate and a surface of the uncured optical interference layer on a side opposite from the other support substrate to obtain the laminated film, wherein a stretch ratio of the laminated film at 160° C. is 50% or more, the laminated film heat-treated at a temperature of 90° C. for 30 minutes has a minimum value $R_{AH}$ of a reflectance taken between wavelengths of 380 nm and 780 nm of 2% or less and measured from a side of the uncured optical interference layer, the composition for forming the optical interference layer comprises a first layer-forming component and low-refractive particles, the first layer-forming component comprises a first reactive component having two or more polymerizable functional groups in one molecule, the first reactive component comprises at least one selected from the group consisting of a first polymer having a weight-average molecular weight of more than 10,000, a first oligomer having a weight-average molecular weight of 10,000 or less, and a first monomer having a weight-average molecular weight of 10,000 or less, and a content X of the low-refractive particles, a total content Y of the first oligomer and the first monomer, and a content Z of the first polymer satisfy the following relationship:

$$X + Y + Z = 100,$$

$$X \geq 30,$$

$$Y \geq 0,$$

$$Z \geq 0, \text{ and}$$

$$Z \leq 1/2X - 15,$$

provided that Y and Z are not 0 at the same time.

15. A method for manufacturing a formed article, the method comprising:

a decoration step of forming a decorative layer on another main surface of the transparent support substrate of the laminated film according to claim 1; and a curing step of irradiating the laminated film with an active energy ray after the decoration step, wherein the decoration step includes a heating step of heating the laminated film at 80° C. or more for 20 minutes or more.

16. The method for manufacturing a formed article according to claim 15, further comprising an injection molding step of, after the decoration step, making the optical interference layer face a mold and injecting a resin for molding toward the decorative layer.

17. The method for manufacturing a formed article according to claim 16, wherein the mold imparts a three-dimensional shape to the laminated film, and the method further comprises a preforming step of forming the laminated film into a shape conforming with the three-dimensional shape after the decoration step and before the injection molding step.

* * * * *